United States Patent
Skinner et al.

(10) Patent No.: US 10,901,230 B2
(45) Date of Patent: Jan. 26, 2021

(54) SUPER-RESOLUTION MICROSCOPY

(71) Applicants: ILLUMINA, INC., San Diego, CA (US); ILLUMINA CAMBRIDGE LIMITED, Cambridge (GB)

(72) Inventors: Gary Mark Skinner, Kedington (GB); Geraint Wyn Evans, Cambridge (GB); Stanley S. Hong, Menlo Park, CA (US); John A. Moon, San Diego, CA (US); M. Shane Bowen, La Jolla, CA (US); Jonathan Mark Boutell, Bishops Stortford (GB); Jason Richard Betley, Cambridge (GB)

(73) Assignees: ILLUMINA, INC., San Diego, CA (US); ILLUMINA CAMBRIDGE LIMITED, Cambridge (GB)

( * ) Notice: Subject to any disclaimer, the term of this patent is extended or adjusted under 35 U.S.C. 154(b) by 51 days.

(21) Appl. No.: 16/311,652

(22) PCT Filed: Jun. 20, 2017

(86) PCT No.: PCT/US2017/038259
§ 371 (c)(1),
(2) Date: Dec. 19, 2018

(87) PCT Pub. No.: WO2017/223041
PCT Pub. Date: Dec. 28, 2017

(65) Prior Publication Data
US 2019/0219835 A1    Jul. 18, 2019

Related U.S. Application Data

(60) Provisional application No. 62/352,892, filed on Jun. 21, 2016.

(51) Int. Cl.
G02B 21/00 (2006.01)
G02B 27/58 (2006.01)
G02B 21/36 (2006.01)

(52) U.S. Cl.
CPC ......... G02B 27/58 (2013.01); G02B 21/0032 (2013.01); G02B 21/0036 (2013.01);
(Continued)

(58) Field of Classification Search
CPC ............... G02B 21/0024; G02B 27/58; G02B 21/0032; G02B 21/0036; G02B 21/0072; G02B 21/0076; G02B 21/367
See application file for complete search history.

(56) References Cited

U.S. PATENT DOCUMENTS 8,547,533 B2    10/2013    Knutson et al.
2008/0213780 A1*    9/2008    Butlin ............... C07D 487/18
                                                    435/6.11
(Continued)

FOREIGN PATENT DOCUMENTS

JP        2015200693 A    11/2015

OTHER PUBLICATIONS

Ding, J., et al., "Superaresolution Imaging in Brain Slices using Stimulated-Emission Depletion Two-Photon Laser Scanning Microscopy", Neuron 63, Aug. 27, 2009, 429-437.
(Continued)

Primary Examiner — Christine S. Kim
(74) Attorney, Agent, or Firm — Illumina, Inc.

(57) ABSTRACT

Example super-resolution microscopy systems are described herein that are configured for relatively high throughput. The disclosed microscopy systems can be to generate an array of sub-diffraction activated areas for imaging. The microscopy systems can be to utilize imaging techniques that employ time delay integration to build up super-resolution images
(Continued)

over time. The disclosed microscopy systems can utilize long-lived fluorophores in conjunction with wide field and patterned illumination to generate super-resolution images of a sample with relatively high throughput.

32 Claims, 10 Drawing Sheets

(52) U.S. Cl.
CPC ..... *G02B 21/0072* (2013.01); *G02B 21/0076* (2013.01); *G02B 21/367* (2013.01)

(56) References Cited

U.S. PATENT DOCUMENTS

| | | |
|---|---|---|
| 2008/0258077 A1 | 10/2008 | Baer |
| 2012/0098949 A1* | 4/2012 | Knebel .............. G02B 21/16 348/79 |
| 2014/0287941 A1 | 9/2014 | Betzig et al. |
| 2015/0034810 A1 | 2/2015 | Iketaki |
| 2017/0351080 A1* | 12/2017 | Robert .............. G02B 21/0076 |
| 2018/0252781 A1* | 9/2018 | Meriles .............. G01R 33/323 |
| 2019/0004299 A1* | 1/2019 | Kukura .............. G02B 21/361 |
| 2019/0284552 A1* | 9/2019 | Collins .............. C12Q 1/6827 |

OTHER PUBLICATIONS

Jin, D., et al., "Nanoparticles for super-resolution microscopy and single-molecule tracking", Nature Methods, Jun. 15, 2018, 415-423.

Roubinet, B., et al., "Carboxylated Photoswitchable Diarylethenes for Biolabeling and Super-Resolution RESOLFT Microscopy", Angewandte Chemie, Int. Ed., vol. 55:49, Dec. 5, 2016, 15429-15433.

Tiwari, D., et al., "A fast- and positively photoswitchabie fluorescent protein for ultralow-laser-power RESOLFT nanoscopy", Nature Methods, 12:6, Jun. 2015, 515-518.

Bergermann, et al., "2000-fold parallelized dual-color STED fluorescence nanoscopy" Optics Express 23 (1), 211-223, 2015.

Bingen, et al., "Parallelized STED fluorescence nanoscopy" Optics express 19 (24), 23716-23726, 2011.

Bueckers, et al., "Simultaneous multi-lifetime multi-color STED imaging for colocalization analyses" Optics Express 19 (4), 3130-3143, 2011.

Scheul, et al., "Two-photon excitation and stimulated emission depletion by a single wavelength" Optics Express 19 (19), 18036-18048, 2011.

Vega-Flick, et al., "Laser-induced transient grating setup with continuously tunable period" Review of Scientific Instruments 86 (12), 123101, 2015.

Yang, et al., "Mirror-enhanced super-resolution microscopy" Light: Science & Applications 5 (6), e16134, 1-8, 2016.

* cited by examiner

SUPER-RESOLUTION MICROSCOPY

CROSS-REFERENCE TO RELATED APPLICATIONS

The present application is a 35 U.S.C. § 371 National Stage application of International Patent Application No. PCT/US2017/038259, filed on Jun. 20, 2017, which claims the benefit of priority to U.S. Provisional Patent Application No. 62/352,892 filed on Jun. 21, 2016, the entirety of which is hereby expressly incorporated by reference.

BACKGROUND

Description of Related Art

Optical microscopy is a powerful tool for investigating samples at sub-micron resolution. For example, in biology and medicine, appropriate molecular tags, such as fluorescent and immunofluorescent tags, are used to label individual molecules. Unique signals from the tags are then detected by an optical microscope to identify their presence and location in and around cells or tissues, or on microarrays. Optical microscopy, however, may be limited to only being able to image features of a few hundred nanometers in size. Below this size, the feature sizes in the cells or tissues become comparable, or smaller, than the physical wavelength of the light. When this occurs, the cell, tissue or microarray features cannot be resolved due to the diffraction of light when it passes through a small aperture or is focused to a tiny spot. This inability to resolve small features is known as the diffraction limit. The diffraction limit, as defined by Ernst Abbe in one example, is the distance that two point-source objects have to be separated to be able to distinguish the objects from one another. The Abbe diffraction limit is equal to $0.5\lambda/NA$, where $\lambda$ is the wavelength of light and NA is the numerical aperture of the object lens that collects light.

Several optical microscopy techniques have been developed to surpass the diffraction limit. Collectively such techniques are referred to as super-resolution microscopy. Some super-resolution microscopy techniques involve moving higher spatial frequencies of light that may be unresolvable to lower spatial frequencies that may be resolved. Certain super-resolution microscopy techniques can generate images having a resolution that surpasses the diffraction limit using fluorescent probes that can be activated and de-activated. By selectively, or randomly, activating targeted probes and detecting their fluorescence, these super-resolution techniques can be configured to distinguish emissions from two molecules that are located within a diffraction-limited range. Generally described, these super-resolution microscopy methods involve switching fluorophores between light and dark states, combined with spatial illumination schemes to isolate the switching behaviors in sub-diffraction areas.

SUMMARY

Provided herein includes examples related to optical microscopy systems.

Embodiments described herein have innovative aspects, no single one of which is indispensable or solely responsible for their desirable attributes. Without limiting the scope of the disclosure and/or claims, some of the advantageous features will now be summarized.

In a first aspect, a super-resolution microscopy system is provided. The system includes an excitation light source, a depletion light source and an optical path. In some embodiments, the system comprises optical components that generate an array of regions, wherein each region comprises an activation region comprising light from the excitation light source surrounded by a depletion region comprising light from the depletion light source. In some embodiments, the system comprises one or more detectors that receive and integrate signals from the regions over time and generate an integrated signal for individual points illuminated by individual ringed regions. In some embodiments a processor is programmed to determine fluorescence of the individual points from the integrated signal.

In some embodiments of the first aspect, the individual points correspond to fluorescent nucleic acid molecules on a solid support. In some embodiments of the first aspect, individual regions are circular ringed regions. In some embodiments of the first aspect, the excitation light source comprises an excitation laser for each region in the array and the depletion light source comprises a depletion laser for each region in the array, and wherein, for each ringed region in the array of ringed regions, the optical path is to direct light from the corresponding excitation laser and depletion laser to generate the ringed region. In a further embodiment, the one or more detectors comprise a detector for each respective region in the array of regions.

In some embodiments of the first aspect, the optical path includes a deflector to direct light from the excitation light source and to direct light from the depletion light source in a time-dependent manner to generate the array of regions. In a further embodiment, the one or more detectors comprise a detector for each region in the array of regions.

In some embodiments of the first aspect, the optical path includes a phase mask to split light from the excitation light source into a plurality of excitation light beams and to split light from the depletion light source into a plurality of depletion light beams to generate the array of regions. In some embodiments of the first aspect, the optical path includes a waveguide to generate a standing wave with the light from the excitation depletion light source within the waveguide.

In some embodiments of the first aspect, the one or more detectors comprises a single detector to detect light from the sample. In a further embodiment, the single detector comprises a multi-channel photon detector. In a further embodiment, the multi-channel photon detector comprises a Charge Couple Device (CCD) image sensor.

In some embodiments of the first aspect, the regions in the array of regions are aligned in a first direction and scanned across the sample in a second direction that is non-orthogonal and non-parallel with respect to the first direction. In a further embodiment, the first direction is perpendicular to the second direction.

In some embodiments of the first aspect, the regions in the array of regions are distributed in a grid comprising a plurality of rows and a plurality of columns. In some embodiments the sample moves in a direction relative to the array of regions that is non-orthogonal and non-parallel with respect to the plurality of rows and the plurality of columns.

In some embodiments of the first aspect, the system includes a scanning system to move the sample so that the array of regions moves relative to the sample. In a further embodiment, the processor uses information from the scanning system to associate signals generated by the one or more detectors with individual points on the sample such that an integrated signal for an individual point on the sample is a result of selectively integrating the signals generated by the one or more detectors that received the light emitted from the individual point on the sample.

In some embodiments of the first aspect, the optical path comprises one or more optical components that generate the array of regions wherein an individual region in the array comprises the activation region and the depletion region surrounding the activation region such that after exposure to the combination of the activation region and the depletion region, only fluorophores in sub-diffraction areas remain activated.

In a second aspect, a super-resolution microscopy system for reading a sample is provide. The system includes an excitation light source. The system includes a depletion light source. The system includes an optical path comprising one or more optical components that generate patterned depletion regions, wherein each patterned region comprises excitation light from the excitation light source and depletion light from the depletion light source. The system includes one or more detectors to receive and integrate signals from fluorophores illuminated by the patterned regions and to generate an integrated signal for individual points on the sample. The system includes a processor that receives the integrated signal from the one or more detectors and determines fluorescence of the fluorophones based on the integrated signal.

In some embodiments of the second aspect, the fluorophores have a dark state with a lifetime that is greater than or equal to about 100 ms. In some embodiments of the second aspect, the fluorophores comprise dyes with off-states that are stable for at least 10 seconds. In a further embodiment, the dyes comprise rhodamine, oxazine or carbocyanine dyes or combinations thereof. In some embodiments of the second aspect, the fluorophores are photoswitched in low oxygen concentrations.

In some embodiments of the second aspect, the scanning system moves the patterned depletion illumination so that it is stationary with respect to the sample as the sample is moved during an imaging cycle. In a further embodiment, the scanning system moves the patterned depletion illumination so that it is shifted from one imaging cycle to another imaging cycle.

In some embodiments of the second aspect, the sample is used with a tailored imaging buffer that includes low oxygen or low oxidizable dyes such that the fluorophores remain de-activated for at least 10 seconds.

In some embodiments of the second aspect, the microscopy system is uses a single saturation cycle for each imaging cycle. In some embodiments of the second aspect, the system includes a scanning system to move the sample, or to scan one or more optical components in the optical path, so that the wide field activation illumination and the patterned depletion illumination move relative to the sample. In a further embodiment, the processor uses information from the scanning system to associate signals generated by the one or more detectors with individual points on the sample such that an integrated signal for an individual point on the sample is a result of selectively integrating the signals generated by the one or more detectors that received the light emitted from the individual point on the sample.

In some embodiments of the second aspect, the patterned regions comprise a first region of activation light surrounded by a second region of depletion light.

In a third aspect, a method is provided of performing super-resolution microscopy to read a sample. The method includes generating an array of regions comprising an activation region surrounded by a depletion region by (i) selectively activating fluorophores on a sample using an excitation light source and (ii) selectively de-activating fluorophores on the sample using a depletion light source, receiving and integrating signals from the regions over time using one or more detectors, determining an integrated signal for individual points on the sample, and determining fluorescence of the individual points on the sample from the integrated signal.

In some embodiments of the third aspect, the sample is an array of nucleic acid features on a solid support. In some embodiments of the third aspect, individual regions are circular ringed regions. In some embodiments of the third aspect, generating the array of regions comprises, for each region in the array of regions, directing light from an excitation laser and a depletion laser to generate the region, wherein the excitation light source comprises an excitation laser for each region in the array and the depletion light source comprises a depletion laser for each region in the array. In a further embodiment, the one or more detectors comprise a detector for each region in the array of regions.

In some embodiments of the third aspect, generating the array of regions comprises deflecting light from the excitation light source and the depletion light source using a deflector in a time-dependent manner. In a further embodiment, the one or more detectors comprise a detector for each region in the array of ringed regions.

In some embodiments of the third aspect, generating the array of regions comprises splitting the light from the excitation light source into a plurality of excitation light beams and splitting light from the depletion light source into a plurality of depletion light beams. In some embodiments of the third aspect, generating the array of regions comprises generating a standing wave with the light from the depletion light.

In some embodiments of the third aspect, the one or more detectors comprises a single detector to detect light from the sample. In a further embodiment, the single detector comprises a multi-channel photon detector. In a further embodiment, the multi-channel photon detector comprises a CCD image sensor.

In some embodiments of the third aspect, the method further comprises scanning the array of regions across the sample in a first direction and scanning the array of regions across the sample in a second direction that is non-parallel with respect to the first direction. In a further embodiment, the first direction is perpendicular to the second direction.

In some embodiments of the third aspect, the regions in the array of regions are distributed in a grid comprising a plurality of rows and a plurality of columns, the method further comprising moving the sample in a direction relative to the array of regions that is non-orthogonal and non-parallel with respect to the plurality of rows and the plurality of columns. In some embodiments of the third aspect, the method includes moving the sample or scanning one or more optical components to move the array of regions relative to the sample. In a further embodiment, the method includes associating signals generated by the one or more detectors with individual points on the sample using information from the scanning system such that an integrated signal for an individual point on the sample is a result of selectively integrating the signals generated by the one or more detectors that received the light emitted from the individual point on the sample.

In some embodiments of the third aspect, an individual region in the array comprises the activation region and the depletion region surrounding the activation region such that after exposure to the combination of the activation region and the depletion region, only fluorophores in sub-diffraction areas remain activated.

In a fourth aspect, a method is provided of performing super-resolution microscopy to read a sample. The method includes generating wide field activation illumination to excite fluorophores within an illuminated region, generating patterned depletion illumination to selectively de-activate fluorophores in a targeted portion of the illuminated region, receiving and integrating signals from the excited fluorophores within the illuminated region using one or more detectors, generating an integrated signal for individual points on the sample, and determining fluorescence of the individual points on the sample from the integrated signal.

In some embodiments of the fourth aspect, the fluorophores have a dark state with a lifetime that is greater than or equal to about 100 ms. In some embodiments of the fourth aspect, the fluorophores comprise dyes with off-states that are stable for at least 10 seconds. In some embodiments of the fourth aspect, the dyes comprise rhodamine, oxazine or carbocyanine dyes or combinations thereof. In some embodiments of the fourth aspect, the fluorophores are photoswitched in low oxygen concentrations.

In some embodiments of the fourth aspect, the method includes moving the patterned depletion illumination using a scanning system so that the patterned depletion illumination is stationary with respect to the sample. In a further embodiment, the method includes moving the patterned depletion illumination so that it is shifted from one imaging cycle to another imaging cycle.

In some embodiments of the fourth aspect, the sample is used with a tailored imaging buffer that includes low oxygen or low oxidizable dyes such that the fluorophores remain de-activated for at least 10 seconds. In some embodiments of the fourth aspect, a single saturation cycle is used for each imaging cycle.

In some embodiments of the fourth aspect, the method includes moving the sample or scanning one or more optical components so that the wide field activation illumination and the patterned depletion illumination move relative to the sample. In a further embodiment, the method includes associating signals generated by the one or more detectors with individual points on the sample using information from the scanning system such that an integrated signal for an individual point on the sample is a result of selectively integrating the signals generated by the one or more detectors that received the light emitted from the individual point on the sample.

In some embodiments of the fourth aspect, the patterned depletion illumination generates regions of zero point intensity to selectively de-activate fluorophores within the targeted region while allowing fluorophores within the regions of zero point intensity to remain activated.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
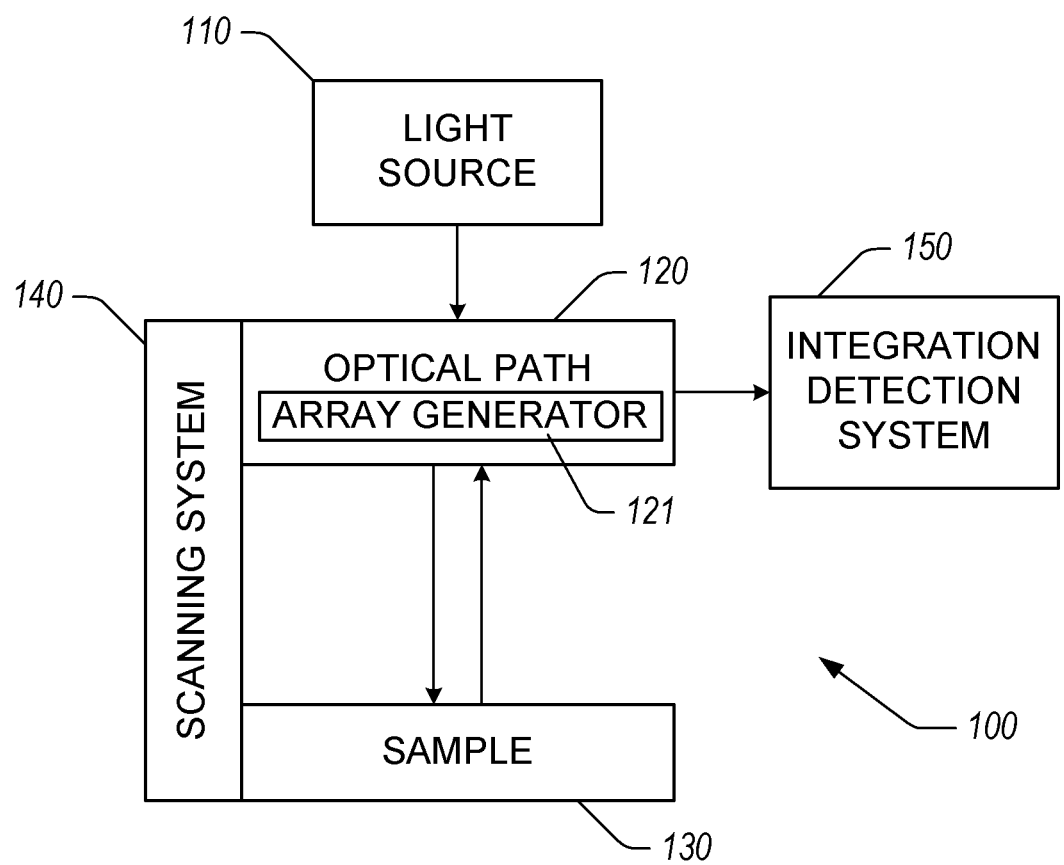
FIG. 1 illustrates an example of a super-resolution microscopy system using parallelization.

Aspects of the present disclosure relate to super-resolution microscopy that uses parallelization of activation and de-activation of fluorescent probes followed by detection of the each probe's fluorescence. The disclosed systems can comprise light sources (e.g., lasers), optical components, scanning systems, and detectors that together provide the advantages and capabilities described herein. In addition, the use of fluorescent probes or dyes with tailored features can be implemented to enable some of the described capabilities and advantages. Aspects of the present disclosure also relate to methods for providing parallelization in super-resolution microscopy systems, whereby power requirements of the light sources are reduced through various methods. This can allow increased parallelization while maintaining laser power consumptions within practical or desired levels. Collectively, embodiments of the disclosed techniques can enable super-resolution microscopy to have a throughput that is comparable to conventional microscopy.

Although examples and implementations described herein focus, for the purpose of illustration, on stimulation emission depletion (STED) microscopy systems and methods, the disclosed features and advantages can also be implemented with other deterministic super-resolution microscopy systems and/or stochastic super-resolution microscopy systems. For example, the disclosed features and advantages can be implemented in systems employing techniques such as reversible saturable optical fluorescence transitions (RESOLFT), ground state depletion (GSD), saturated structured illumination microscopy (SSIM), super-resolution via transiently activated quenchers (STAQ), stochastic optical reconstruction microscopy (STORM), photo-activated localization microscopy (PALM), single-molecule localization microscopy (SMLM), super-resolution optical fluctuation imaging (SOFI), spectral precision distance microscopy (SPDM), etc. Additionally, although some examples are described in the context of DNA sequencing, the disclosed systems and methods can be implemented for a wide variety of applications that benefit from super-resolution microscopy with high throughput. Exemplary applications include, but are not limited to, those that perform optical detection of molecular probes that interact with targets such as nucleic acid hybridization assays, antibody binding assays, protein-protein interaction assays, protein-nucleic acid interaction assay. Further exemplary applications can include detection of enzyme reactions based on consumption of optical reactants or creation of optical products, detection of small molecules such as candidate therapeutic agents that interact with proteins, cells or other biological molecules to produce optically detectable signal changes, detection of optically labeled cells or tissues, and the like. Various aspects of the disclosure will now be described with regard to certain examples and embodiments, which are intended to illustrate but not limit the disclosure.

Embodiments relate to super-resolution microscopy techniques that have a relatively high throughput in comparison to other optical microscopy techniques. In one embodiment, this can be achieved through parallelization techniques. For example, parallelization techniques disclosed herein can be used to simultaneously, or near-simultaneously, image multiple locations on a sample using super-resolution techniques. As another example, techniques disclosed herein can be used to increase throughput while still being able to collect sufficient light to resolve features of interest through the use of techniques that employ time delay integration for data acquisition. As another example, techniques disclosed herein can be used to increase data acquisition rates by decreasing the frequency with which fluorescent probes are excited and de-activated. Advantageously, the systems and methods disclosed herein for super-resolution microscopy can, for example, enable the use of less reagent in certain imaging applications, lower costs associated with super-resolution microscopy, and/or resolve targets with a size that is less than or equal to about 100 nm or less than or equal to about 50 nm (which corresponds to about 1 human genome per square millimeter in some nucleic acid array-based applications).

A problem that arises when attempting to increase throughput while simultaneously trying to resolve small structures is the lack of sufficient photons available for imaging. Where fluorophores are used, for example, there are fewer fluorophores in a region being imaged resulting in fewer photons. Generally, this may be solved by integrating over longer times to acquire a sufficient photon signal to generate an image (e.g., to improve signal to noise to resolve structures or features), but this may have an adverse effect on data acquisition rates, and hence throughput. For example, in sequencing applications where the targeted resolution is less than or equal to about 100 nm or less there may be tens of molecules in a cluster being imaged. As described herein, this problem may be solved by parallelizing the data acquisition process so that the system dwells on each feature being imaged long enough to collect sufficient photons to achieve a targeted signal to noise ratio. In some embodiments, parallelization can be accomplished by simultaneously activating fluorophores in a plurality of locations rather than in a single location. In some implementations, parallelization can also be accomplished by detecting fluorescence from these activated locations simultaneously.

In one embodiment, the system uses chemical photo-switching of organic fluorophores to reduce laser power requirements and enable parallelization with high throughput. In contrast to stimulated emission, optical transitions of certain organic fluorophores can be accomplished with relatively little laser energy. Additionally, certain organic fluorophores can be used that have stable dark states. In one example, such fluorophores make it possible for a single saturation cycle to be sufficient for each imaging cycle, as opposed to thousands or millions of optical saturation cycles per second for other super-resolution techniques.

Additionally, as described herein, other super-resolution techniques may be employed that utilize less laser power to achieve excitation and depletion of targeted fluorophores. For example, and without limitation, one such technique is referred to as Super Resolution via Transiently Activated Quenchers (STAQ) and utilizes bipartite probes that separate the luminescent and quenching functions into two coupled molecules. This results in less deactivation power being needed for super-resolution imaging. Further examples and description of the STAQ technique is included in U.S. Pat. No. 8,547,533, entitled "Composite probes and use thereof in super resolution methods," issued Oct. 1, 2013, the entire contents of which is incorporated by reference herein for all purposes to form part of this specification.

The STAQ methodology is a super resolution optics technique wherein a composite probe, e.g., a novel type of Fluorescence Resonance Energy Transfer (FRET) pair separated by a linker, is used to narrow the point spread function of a probe population within an exciting light beam. Narrowing the point spread function narrows the spot size of, for example, a fluorescence microscope. The composite probe is comprised of a donor moiety and a Transiently Activated Quencher (TAQ) (e.g., acceptor) joined by a linker such as a polyproline. In one example, the TAQ, in its ground state, does not absorb in the emission band region of the donor. However, the TAQ in its excited state absorbs significantly in the donor emission region. In the STAQ technique, the donor excitation light beam excites the donor moiety and the quenching light beam excites the transiently activated quencher moiety, effectively shutting off a portion of the donor emission by a quenching mechanism that may pass across or through the linker.

Additionally, long Stoke's shift dyes may be used to separate the excitation and depletion wavelengths of the fluorescent probes further. In some implementations, this may allow the wavelength of the depletion laser to be in a more efficient portion of the depletion spectrum, thereby allowing less laser energy to be used to deactivate targeted fluorophores with such dyes. In certain embodiments, this can be accomplished using dyes with an about 150-nm Stoke's shift. In various implementations, this can result in about 10 times more efficient depletion relative to typical dyes with comparable depletion laser energies.

These techniques can be used to reduce the amount of laser power required in super-resolution microscopy techniques, but the challenge of a lack of photons may still remain. As described herein, techniques may be used to effectively dwell on each sub-diffraction area being imaged long enough to detect sufficient photons to achieve a targeted or desirable signal to noise ratio.

For example, systems that utilize time delay integration (TDI) for data acquisition can be implemented to image sub-diffraction areas. Such systems can be scan a line of sub-diffraction areas (e.g., a plurality of sub-diffraction areas, aligned along the x dimension of a sample, that are scanned in a dimension other than the x dimension, such as the y dimension) to trace a series of parallel lines over the sample and/or to scan a grid of sub-diffraction areas (e.g., a plurality of sub-diffraction areas, arrayed along the x and y dimensions of a sample, that are scanned in a linear dimension to trace a series of parallel lines over the sample). Typical STED systems utilize a line scan where a single ringed excitation region is generated and scanned in a line across a sample in a raster-like fashion. In several examples set forth herein, a ringed shaped region is used to describe the excitation regions. However, it will be understood that the regions and rings need not necessarily be circular. Rather, excitation sources and shaping optics can be used to create other shapes such as clover-leaf structures, hexagonal or rectangular arrays, or almost any variation of light and dark regions that create regions of high laser intensity, and other regions of low/zero laser power intensity.

In embodiments of the improved STED systems disclosed herein, an array of rings can be generated and scanned over the sample to perform scans of different regions in parallel. In some implementations, this array can be effectively equivalent to parallel line scans and the system can scan the sample such that individual points of the sample pass through multiple rings in the array. For each STED ring that an illumination point passes through, a data acquisition system integrates the resulting photon signal so that there is an effectively longer exposure time for the points being imaged. Generally, the described TDI-like techniques can be configured to shift photons algorithmically so that detected photons follow the point being imaged. This allows the super-resolution microscopy systems to integrate the signal for these points as the point being imaged moves into a different scan line. For example, the system detect signals, or be configured to detect signals, from different scan lines using different sensors (e.g., different photodetectors or different pixels in an image sensor). The system can associate data acquired with different detectors with the point being imaged in respective scan lines and to integrate these signals to obtain a total signal for the point. This can occur for an array of points in parallel. Consequently, these TDI-like techniques effectively dwell on points of a sample for longer by collecting photons from the same location on the sample where that location is excited multiple times by different STED rings.

These super-resolution techniques may be particularly valuable in connection with DNA sequencing. It is desirable to apply a super-resolution technique for sequencing of nucleic acids located at sub-diffraction sized features of an array such as wells or other features on a solid support that present single nucleic acid molecules or clusters of nucleic acid amplicons. The higher density permitted by super-resolution may lead to lower costs-per-genome. For example, increasing feature density on sequencing flow-cells allows a given solution of sequencing reagent to interact with more nucleic acids, thereby producing more sequencing data. This, in turn, provides a substantial decrease in sequencing costs since the reagents are incrementally consumed across multiple cycles of a sequencing run. Moreover, the super-resolution techniques may be a more efficient use of reagents resulting in more sequencing data per unit of reagent. Further progress in decreasing consumable costs is beneficial, as these costs may be a large fraction of the cost-per-genome, in contrast to instrument costs-per-genome, which may fall as the throughput of factory sequencers increases. Improvements to imaging speed can provide a significant improvement to implementing super-resolution sequencing. Accordingly, some embodiments described herein include techniques to increase the speed of imaging in super-resolution microscopy systems for sequencing.

The improvements in super-resolution microscopy described herein can be applied to a variety of super-resolution techniques. Super-resolution microscopy can include techniques that utilize "stimulated emission," but is more generally applicable to systems and methods that switch molecules between light and dark states in a spatially controlled manner. Stimulated emission is one way of achieving photo-switching. In some embodiments, where stimulated emission requires impractically high laser intensities to switch molecules, then different photo-switching mechanisms can be employed. Alternative photo-switching mechanisms include, for example and without limitation, transitions between singlet and triplet states, quenched and non-quenched states, photochemical transitions, photo-isomerizations, etc.

Overview of Super-Resolution Microscopy System with High Throughput

Turning now to FIG. 1, an example of a super-resolution microscopy system 100 using parallelization is illustrated. The example microscopy system 100 can implement, or be configured to implement, one or more of the parallelization techniques described herein and/or one or more of the techniques to reduce the amount of light intensity utilized to achieve super resolution imaging. Particular example implementations of the microscopy system 100 are described herein with respect to FIGS. 2A-2D and 6. The microscopy system 100 generates super-resolution imagery of a sample 130 using any suitable combination of the techniques described herein. The microscopy system 100 can implement super-resolution techniques such as, for example and without limitation, STED, STORM, STAQ, SSIM, GSD, PALM, SMLM, SOFI, SPDM, etc. and variations of such techniques.

The microscopy system 100 includes light source 110 that can provide light to selectively activate and/or de-activate fluorophores at targeted points on a sample. The light source 110 can be one or more lasers. The light source 110 can include light sources that provide different wavelengths of light. The light source 110 can provide light having wavelengths that are tuned to selectively activate fluorescence and/or inhibit fluorescence.

The microscopy system 100 includes an optical path 120 from the light source 110 to the sample 130. The optical path 120 includes a combination of one or more of mirrors, lenses, prisms, quarter wave plates, half wave plates, polarizers, filters, dichroic mirrors, beam splitters, beam combiners, and the like. The optical path 120 can be direct light from the light source 110 to the sample 130. In addition, the optical path 120 includes optical components direct light, or can be configured to direct light, emitted from the sample 130 to an integration detection system 150. In some embodiments, a portion of the optical elements that are used to direct light from the light source to the sample are also used to direct light from the sample 130 to the integration detection system 150. The optical path 120 can include an objective lens. The objective lens can be immersed in a liquid such as water or oil or the objective lens can be used without immersion. Examples of optical paths and optical systems used with super-resolution microscopy are included in U.S. Pat. No. 7,589,315, entitled "Confocal Imaging Methods and Apparatus," issued Sep. 15, 2009, in U.S. Pat. No. 8,951,781, entitled "Systems, Methods, and Apparatuses to Image a Sample for Biological or Chemical Analysis," issued Feb. 10, 2015, and U.S. Pat. No. 9,193,996, entitled "Integrated Optoelectronic Read Head and Fluidic Cartridge Useful for Nucleic Acid Sequencing," issued Nov. 24, 2015, each of which is incorporated by reference herein in its entirety.

The microscopy system 100 includes a scanning system 140 to effectively move light relative to the sample 130 to scan the sample 130 to generate an image. The scanning system 140 can be implemented within the optical path 120, in some embodiments. For example, the scanning system 140 can include one or more scanning mirrors that move relative to one another within the optical path 120 to effectively move the light from the light source 110 across the sample. The scanning system 140 can be implemented as a mechanical system that physically moves the sample 130 so that the sample moves relative to the light from the light source 110. The scanning system 140 can be a combination of optical components in the optical path 120 and a mechanical system for physically moving the sample 130 so that the light from the light source 110 and the sample 130 move relative to one another.

The microscopy system 100 includes an integration detection system 150 that includes one or more light detectors as well as associated electronic circuitry, processors, data storage, memory, and the like to acquire and process image data of the sample 130. The integration detection system 150 can include photomultiplier tubes, avalanche photodiodes, image sensors (e.g., CCDs, CMOS sensors, etc.), and the like. In some embodiments, the light detectors of the integration detection system 150 can be include components cto amplify light signals and may be sensitive to single photons. In some embodiments, the light detectors of the integration detection system 150 can have a plurality of channels or pixels. The integration detection system 150 can generate a super-resolution image based on the light detected from the sample 130.

The optical path 120 includes an array generator 121 that generates a plurality of activation and/or de-activation regions on the sample 130. These regions can be scanned over the sample 130 using the scanning system 140 to selectively activate sub-diffraction areas for imaging. The integration detection system 150 can integrate signals corresponding to particular points on the sample 130 as the plurality of activation and/or de-activation regions are scanned over the sample 130. For individual points on the sample 130, the integration detection system 150 can selectively aggregate detection signals corresponding to the individual point where the individual point is activated at different times by different activation and/or de-activation regions. Thus, the combination of the array generator 121 and the integration detection system 150 can detect light simultaneously, or near-simultaneously, from a plurality of points on the sample 130 and to integrate the detected light from the plurality of points over time to generate a super-resolution image of at least a portion of the sample 130.

Examples of Microscopy Systems that Generate an Array of STED Rings

FIGS. 2A-2D illustrate different embodiments of the super-resolution microscopy system 100 of FIG. 1. These example microscopy systems will be described as implementing STED super-resolution techniques, but these systems can utilize any suitable super-resolution technique that utilizes an excitation light source and a depletion light source to selectively activate fluorophores. These systems utilize a TDI-like data acquisition approach that integrates signals from individual points on a sample over multiple scans to generate super-resolution image data of the sample. For example, the systems can generate an array of parallel line scans such that a point being imaged passes through each line scan in the array and a detection system integrates the signal from each line scan. Where there are 10 lines in the array, by way of example, this can effectively provide about ten times the exposure time relative to a STED system with a single line scan with the sample moving at substantially the same speed through the system.

The integration detection systems 250a-250d of the respective microscopy systems 200a-200d can associate, or be configured to associate, detected signals with corresponding points on the sample 130 so that the signals can be integrated. The integration detection systems 250a-250d can utilize an image sensor such as a CCD camera, a staring sensor, a plurality of PMTs, or the like. The integration detection systems 250a-250d can associate, or be configured to associate, detected signals with corresponding points based on spatial information in the detection of the signal. For example, the location of the sensor detecting the photons can be associated with a particular line scan. As another example, the timing of the signal from the sensor can be associated with a particular location of the line scan on the sample. Combining the timing information with the location information, the integration detection systems 250a-250d can associate signals from different sensors at different times with the appropriate point on the sample. In this way, the detection system can accurately integrate signals from different sensors corresponding to photons emitted from a particular point on the sample.

Generally speaking, in STED microscopy a depletion laser is co-aligned with an excitation laser to generate a region of "permitted emission" surrounded by a region of depletion. The depletion laser is exemplified herein with respect to producing a ring shaped depletion region, with the hole in the ring being the region of permitted emission. This permitted emission region is much smaller than the conventional diffraction-limited spot of a regular microscope, and by scanning this over a sample, super-resolution imagery is obtained. STED microscopy combines two diffraction-limited intensity distributions (e.g., a Gaussian excitation distribution and a ring-shaped depletion distribution with other configurations of distributions possible, as described herein) together with photo-switching mechanisms based on fluorescence excitation and stimulated emission. Combining these features may allow the spatial confinement of fluorescence emission from a sample, and thus super-resolution imaging.

In more detail, a confocal point spread function (PSF) may be used to excite fluorescent molecules within a diffraction-limited area. Rapidly following this, before the molecules can relax and emit photons, a "depletion pulse" (e.g., a ring shaped depletion pulse) is used to force excited molecules in the periphery of the PSF back to their ground state, via the process of stimulated emission. By using sufficiently high laser intensity, this ring can saturate the transition to the ground state, forcing substantially every molecule within the ring-shaped depletion pulse into the ground state, while the molecules within the center of the ring remain excited. After the depletion pulse, the spatially-confined excited molecules within the center of the ring can relax according to their fluorescence emission timescale, emitting photons which are then detected. Because these photons originate from a sub-diffraction area, they can be used to generate super-resolution image data. A full image is created by scanning this PSF-ring across the sample and collecting the signal on a photodetector.

Conventional STED systems may be slow because each location within a sample is visited by the point, and the point resides on a given location for long enough so that sufficient photons are collected to make a reliable measurement (e.g., base-calling for DNA sequencing). As described herein, the microscopy systems 200a-200d can generate, or be configured to generate, an array of STED rings and data acquisition can be performed in a similar way to TDI scanning. For example, by using a series of STED ring line scans, a longer effective exposure of individual points on a sample can be provided. The system can thus obtain data with a signal to noise ratio that is comparable to typical single ring STED systems at a higher effective imaging speed.

As described herein, TDI-like data acquisition is a way to achieve long exposure time for points on a sample while simultaneously moving the sample. For example, an object moves past a series of sensors (e.g., where an individual sensor can be a pixel on a CCD chip, a channel on an APD, an individual photodiode, an individual PMT, or the like). As the object moves, photons are collected on the sensor, and as the object moves from one sensor to the next, the accumulated signal is shifted along the series of sensors. This shift in signal can be accomplished by physically shifting the signal from sensor to sensor and/or algorithmically in the integration detection systems 250a-250d. By the time the object reaches the end of the series of sensors, the image of the object includes multiple exposures from different sensors. The signals from the different sensors can be aggregated (e.g., integrated) to generate an image with a signal to noise ratio that is comparable or better than a similar system that acquires a single exposure of points on the sample.

By way of example, a STED microscopy system with a single ring can scan, or be configured to scan, 100-nm wells at a throughput of approximately 20,000 to 100,000 wells per second. It may be desirable to increase this throughput to about 500M wells per second. By increasing the number of PSFs used to create an image, the super-resolution microscopy systems described herein can reach or exceed this targeted throughput. A STED microscopy system with 25,000 spots, for example, can reach this targeted throughput while maintaining the same resolution (e.g., scanning 100-nm wells).

Figure 2A:
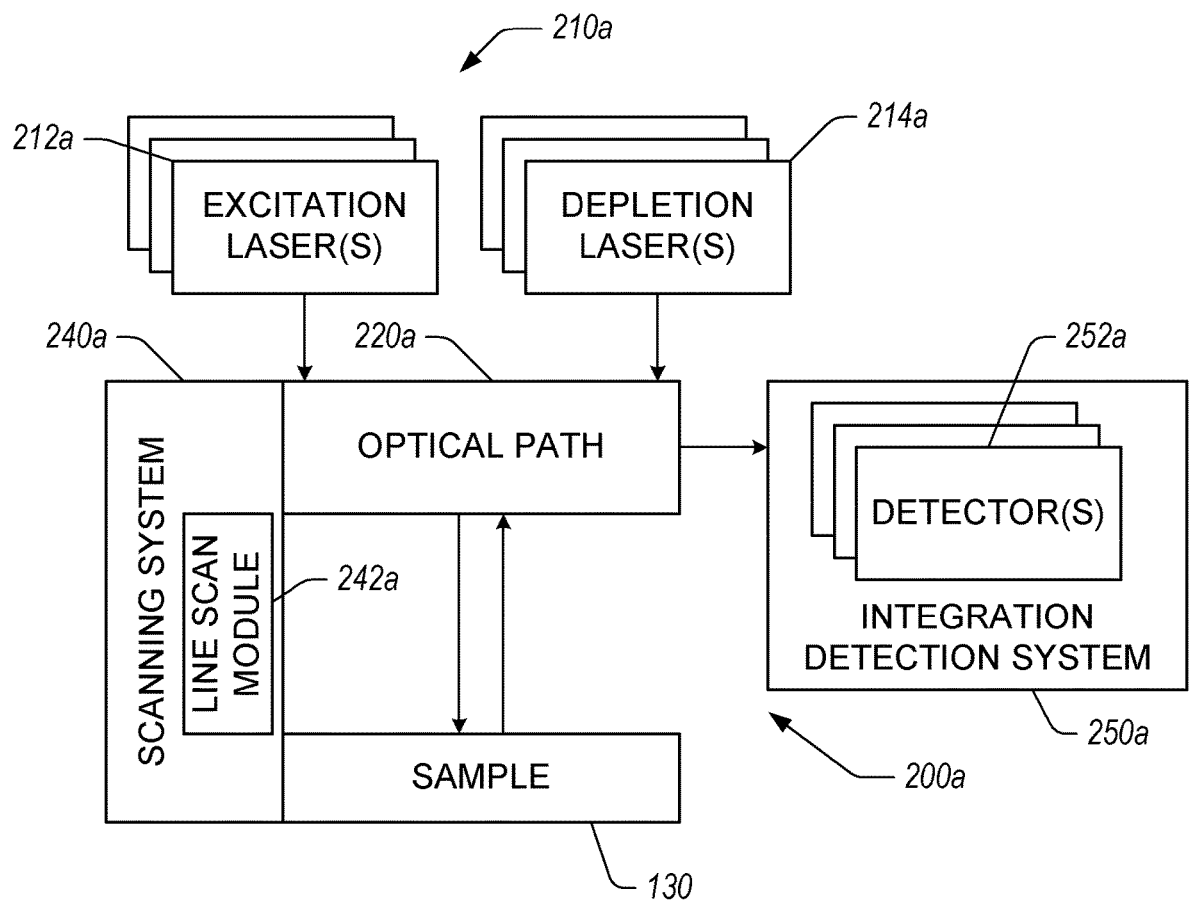
FIGS. 2A-2D illustrate example embodiments of the super-resolution microscopy system of FIG. 1.

FIG. 2A illustrates an example microscopy system 200a that generates, or is configured to generate, multiple STED rings using a plurality of excitation lasers 212a, a plurality of depletion lasers 214a, and a plurality of detectors 252a. The microscopy system 200a can include an independent laser (e.g., excitation laser 212a and depletion laser 214a), beam-steering (e.g., part of the optical path 220a or scanning system 240a), and detection apparatus (e.g., detectors 252a) for every ring in the array of STED rings. The microscopy system 200a can replicate, or be configured to replicate, the optical light path and detection setup used in a typical STED microscopy system for each ring in the array. The scanning system 240a includes a line scan module 242a scan the rings generated using the respective excitation lasers 212a and depletion lasers 214a across the sample 130. Examples of line scans of arrays of rings are described in greater detail herein with respect to FIGS. 4A and 4B.

The integration detection system 250a can integrate signals from the detectors 252a to generate an integrated signal for individual points on the sample 130. The integration detection system 250a can use information from the scanning system 240a, for example, to determine which signals from the detectors 252a to integrate to generate these integrated signals for the individual points on the sample 130.

Figure 2B:
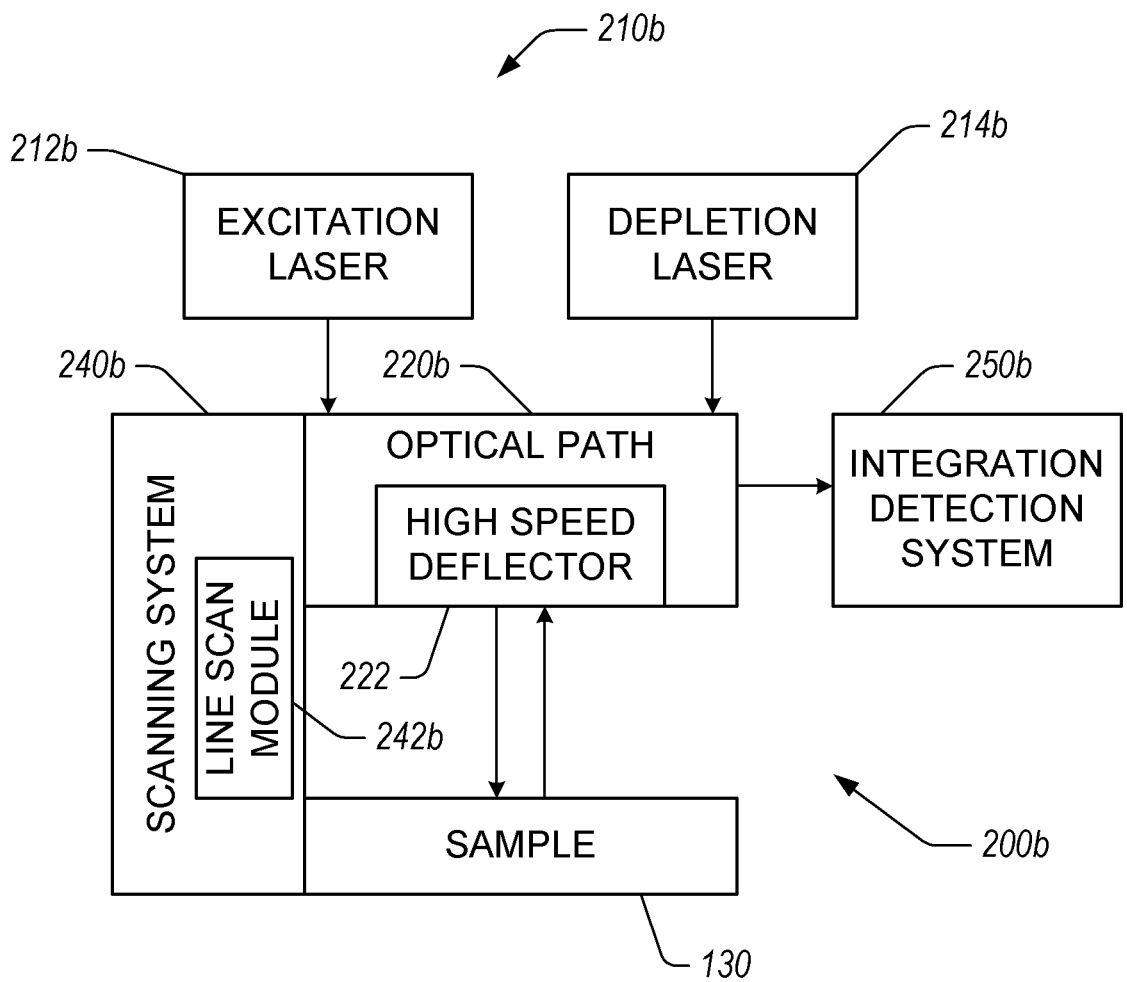

FIG. 2B illustrates an example microscopy system 200b that includes a deflector 222 in the optical path 220b. The deflector 222 is configured to deflect light respectively from an excitation laser 212b and a depletion laser 214b to generate an array of STED rings. The microscopy system 200b with the deflector 222 can provide the array of STED rings using a time sharing approach where the same laser source is used to respectively generate the excitation pulse (e.g., using the excitation laser 212b) and depletion pulse (e.g., using the depletion laser 214b) for each ring in the array. The deflector 222 can be any type of high frequency beam steering device such as high speed deflectors, for example, acousto-optic deflectors. For better illustration, deflector 222 herein is referred to as a high speed deflector, but deflector 222 may be any suitable deflector as described herein.

The scanning system 240b includes a line scan module 242b scan the rings generated using the respective excitation laser 212b and depletion laser 214b across the sample 130. Examples of line scans of arrays of rings are described in greater detail herein with respect to FIGS. 4A and 4B.

In some embodiments, the integration detection system 250b can include a high-frequency single-photon detector such as a SPAD, APD, PMT, or the like. The detector can be time-shared between the various STED lines (e.g., rings in the array). The integration detection system 250b can include data acquisition systems that correlate signals generated as a function of time with corresponding rings and locations on a sample 130. This can allow the integration detection system 250b to integrate signals from multiple rings where the integrated signal corresponds to image data of a particular point on the sample 130.

In some embodiments, the integration detection system 250b includes a detector with a spatial component so that the location of the detected photons on the detector along with the timing of the detected photons can be used to generate image data of particular positions on the sample 130. For example, the detector can be an APD array, an image sensor, a microchannel photodetector, or the like. Light from points on the sample 130 that are spaced apart farther than the diffraction limit of the microscopy system 200b can be directed to different locations on the detector. The array of rings can be configured so that individual rings in the array are each spaced apart from one another with a distance that exceeds the diffraction limit of the microscopy system 200b, as described in greater detail herein with reference to FIGS. 4A, 4B and 5.

In some embodiments, the light emitted from individual points on the sample corresponding to individual rings can be directed to different locations on the detector using the optical path 220b and/or the high speed deflector 222. The rings generated using the high speed deflector 222 can be scanned across the sample 130 using the scanning system 240b, and in particular, the line scan module 242b of the scanning system 240b. The scanning system 240b can include scanning mirrors to move the array of rings across the sample 130. The integration detection system 250b can use information from the high speed deflector 222 and/or the scanning system 240b to determine which signals from the detector correspond to particular points on the sample 130 so that the integration detection system 250b can integrate the signals from the detector that correspond to individual points on the sample 130.

Figure 2C:
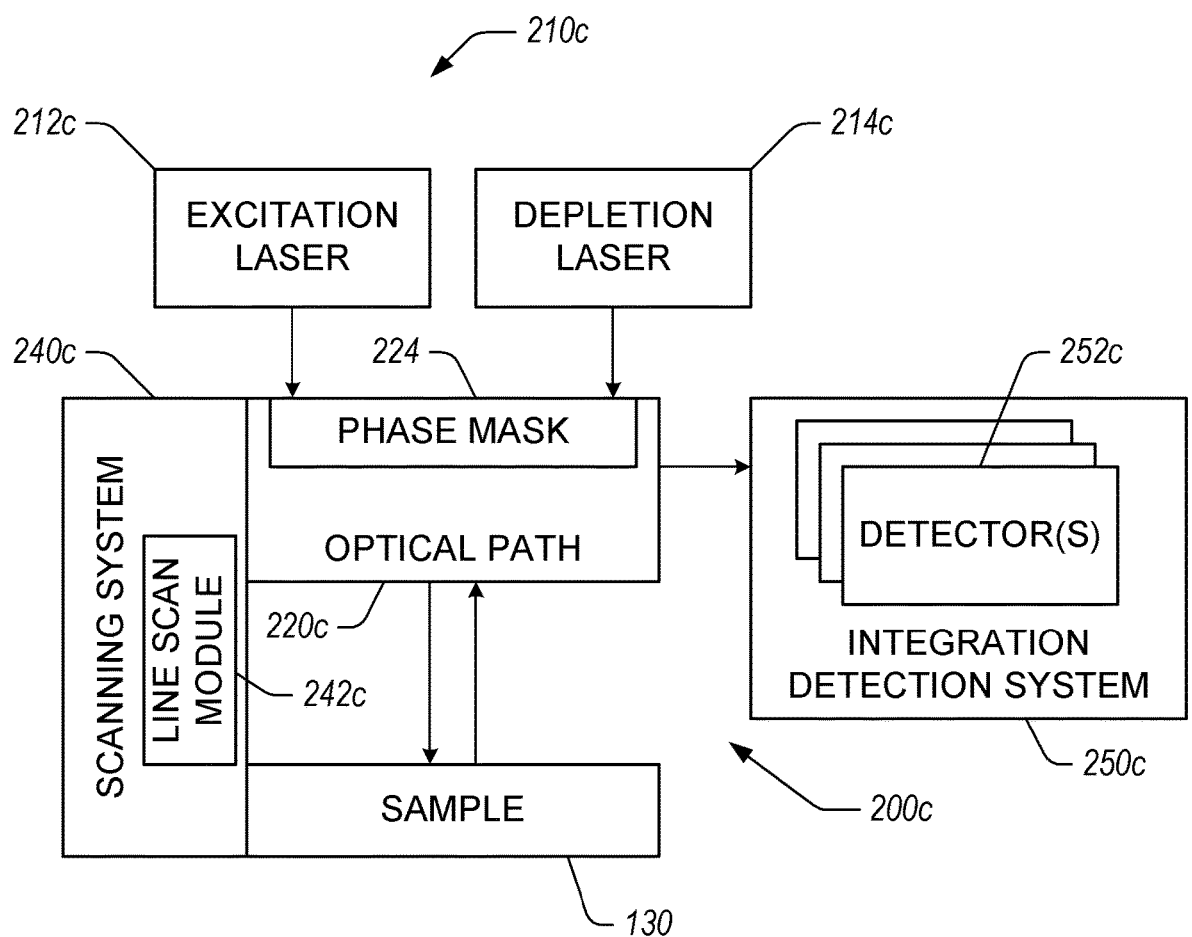

FIG. 2C illustrates an example microscopy system 200c that includes a phase mask 224 in the optical path 220c. The phase mask 224 deflects light respectively from an excitation laser 212c and a depletion laser 214c to generate an array of STED rings. The microscopy system 200c with the phase mask 224 can provide the array of STED rings by splitting the respective lasers into multiple beams. In some embodiments, a single excitation laser 212c and a single depletion laser 214c can be used to provide the respective excitation and depletion pulses for all of the rings in the array. In some embodiments, the phase mask 224 can include a diffraction grating.

The scanning system 240c of the microscopy system 200c can scan the rings in the array across the sample 130. The scanning system 240c can move the sample 130 relative to the rings in the array.

In some embodiments, the integration detection system 250c includes a plurality of detectors 252c for detecting signals from points on the sample 130, the points corresponding to locations on the sample 130 where a ring from the generated array is incident. The detectors 252c can include any suitable photon detector as described herein such as, for example and without limitation, PMTs, APDs, CCD camera, staring sensor, etc. The integration detection system 250c can include data acquisition systems that correlate signals with corresponding rings and locations on a sample 130. This can allow the integration detection system 250c to integrate signals from multiple rings where the integrated signal corresponds to image data of a particular point on the sample 130.

In some embodiments, the detectors 252c comprise one detector for each ring in the array of STED rings. In certain embodiments, the detectors 252c comprise an array detector with a channel or sensor corresponding to each STED ring in the array. In this way, each detector or sensor of the plurality of detectors 252c generates a signal corresponding to light emitted from a point on the sample that was excited by a particular ring in the array. The integration detection system 250c can use information from the scanning system 240c and timing information to determine which signals from particular detectors or sensors correspond to a particular point on the sample. For example, using the scanning and time delay integration techniques described herein, multiple different detectors at different points in time can detect light emitted from a particular point on the sample 130. The integration detection system 250c can integrate the appropriate signals from the respective detectors to determine an integrated signal for individual points on the sample 130.

In some embodiments, the integration detection system 250c includes detectors 252c with a spatial component so that the location of the detected photons on the detector along with the timing of the detected photons can be used to generate image data for particular positions on the sample 130. For example, the detector can be an APD array, an image sensor, a microchannel photodetector, or the like. Light from points on the sample 130 that are spaced apart farther than the diffraction limit of the microscopy system 200c can be directed to different locations on the detector. The array of rings can be configured so that individual rings in the array are each spaced apart from one another with a distance that exceeds the diffraction limit of the microscopy system 200c, as described in greater detail herein with reference to FIGS. 4A, 4B and 5.

In some embodiments, the light emitted from individual points on the sample corresponding to individual rings can be directed to different detectors 252c using the optical path 220c. The rings generated using the phase mask 224 can be scanned across the sample 130 using the scanning system 240c, and in particular, the line scan module 242c of the scanning system 240c. The scanning system 240c can include scanning mirrors move the array of rings across the sample 130. The integration detection system 250c can use information from the scanning system 240c and information about the detectors 252c to determine which signals from the respective detectors 252c correspond to particular points on the sample 130 so that the integration detection system 250c can integrate the signals from the particular detector that corresponds to individual points on the sample 130. The scanning system 240c includes a line scan module 242c to scan the rings generated using the respective excitation laser 212c and depletion laser 214c across the sample 130. Examples of line scans of arrays of rings are described in greater detail herein with respect to FIGS. 4A and 4B.

Figure 2D:
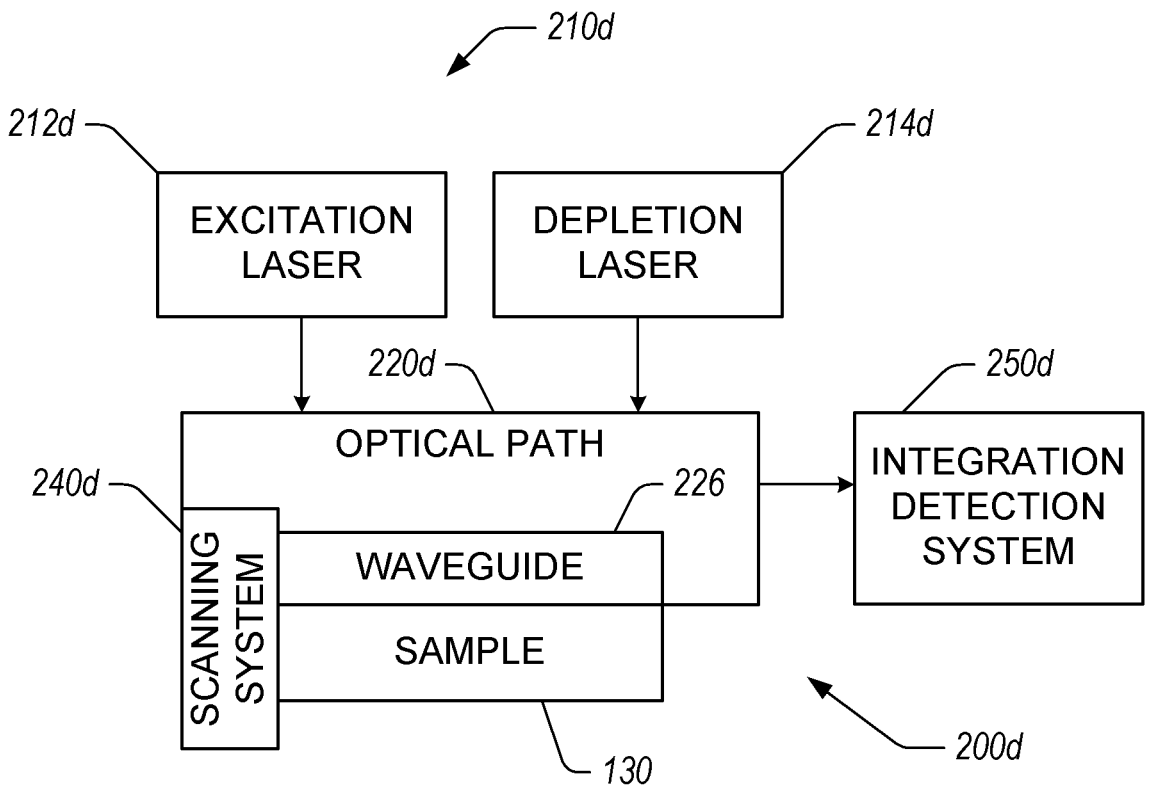

FIG. 2D illustrates an example microscopy system 200d that includes a waveguide 226 in the optical path 220d. The waveguide 226 is generates a standing mode inside the waveguide 226. The microscopy system 200d can shift the wavelength of the light provided by the depletion laser 214d to move where the peaks and valleys of the standing mode in the waveguide 226 are located relative to the sample 130. The microscopy system 200d with the waveguide 226 can provide the array of STED rings by using the excitation laser 212d to illuminate the sample and generating the standing mode for the depletion laser 214d which includes a plurality of nodes and anti-nodes, the nodes corresponding to locations of zero intensity of the depletion laser, and hence, regions of excitation on the sample. In some embodiments, a single excitation laser 212d and a single depletion laser 214d can be used to provide the respective excitation light and depletion pulses for all of the rings in the array. In some embodiments, the waveguide 226 includes a plurality of waveguides oriented orthogonally with waveguide couplers at right angles to one another. In some embodiments, the waveguide 226 includes an optical cavity. In certain embodiments, the waveguide 226 includes a Fabry-Perot interferometer.

Figure 3:
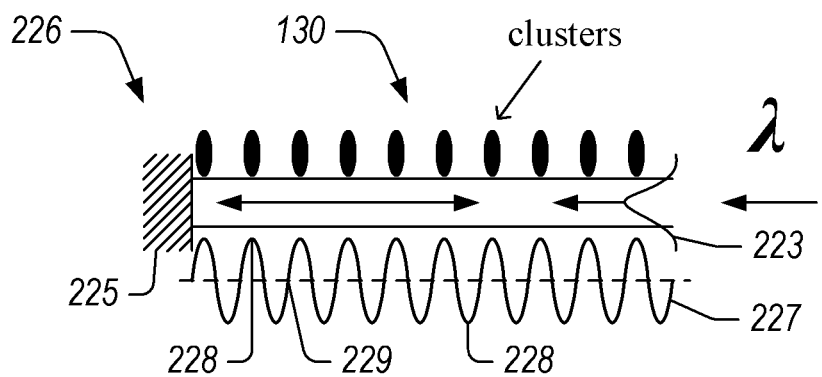
FIG. 3 illustrates an example of a waveguide in an optical path of the microscopy system of FIG. 2D, the waveguide generates a standing wave.

FIG. 3 illustrates an example of a waveguide 226 in an optical path of the microscopy system 200d of FIG. 2D, the waveguide 226 generates a standing wave 227. The peaks 228 (or anti-nodes) of the standing wave 227 can correspond to depletion locations on the sample 130 to be imaged, such as clusters, whereas the nodes 229 of the standing wave can correspond to locations of zero intensity of the depletion light source. The waveguide 226 can include a reflector 225 to reflect incoming light 223 to generate the standing wave 227.

To shift the locations of the peaks 228 and nodes 229 of the standing wave 227, the wavelength of the injected light 223 can be modified. For example, where the light source is a diode laser, the temperature of the laser diode can be altered to change the output wavelength of the laser. As another example, heat can be used in the waveguide 226 to shift the locations of the peaks 228 and nodes 229. A change of temperature in the waveguide 226 causes a change in the refractive index, thereby increasing or decreasing the optical path length inside the waveguide 226.

Returning to FIG. 2D, the microscopy system 200d can include a scanning system 240d that move the sample 130 with respect to the waveguide 226, to change the properties of the standing wave 227 in the waveguide, and/or to modify the wavelength of the light 223 provided to the waveguide 226.

The microscopy system 200d can include an integration detection system 250d to detect light from a plurality of points on the sample 130. Similar to the detection systems described herein with reference to FIGS. 1 and 2A-2C, the detection system 250d can integrate signals from the sample 130 to provide TDI-like data acquisition for multiple points on the sample 130. This can be accomplished using a plurality of detectors, one or more detectors with a plurality of channels or sensors, one or more detectors that are time shared between different STED rings, a plurality of detectors that are spatially-dependent (e.g., the location of the detected signal provides information about the STED ring and/or location on the sample 130), one or more detectors that are time-dependent (e.g., the time of the detected signal provides information about the STED ring and/or location on the sample 130), or any combination of these.

TDI-Like Data Acquisition with an Array of STED Rings

Figure 4A:
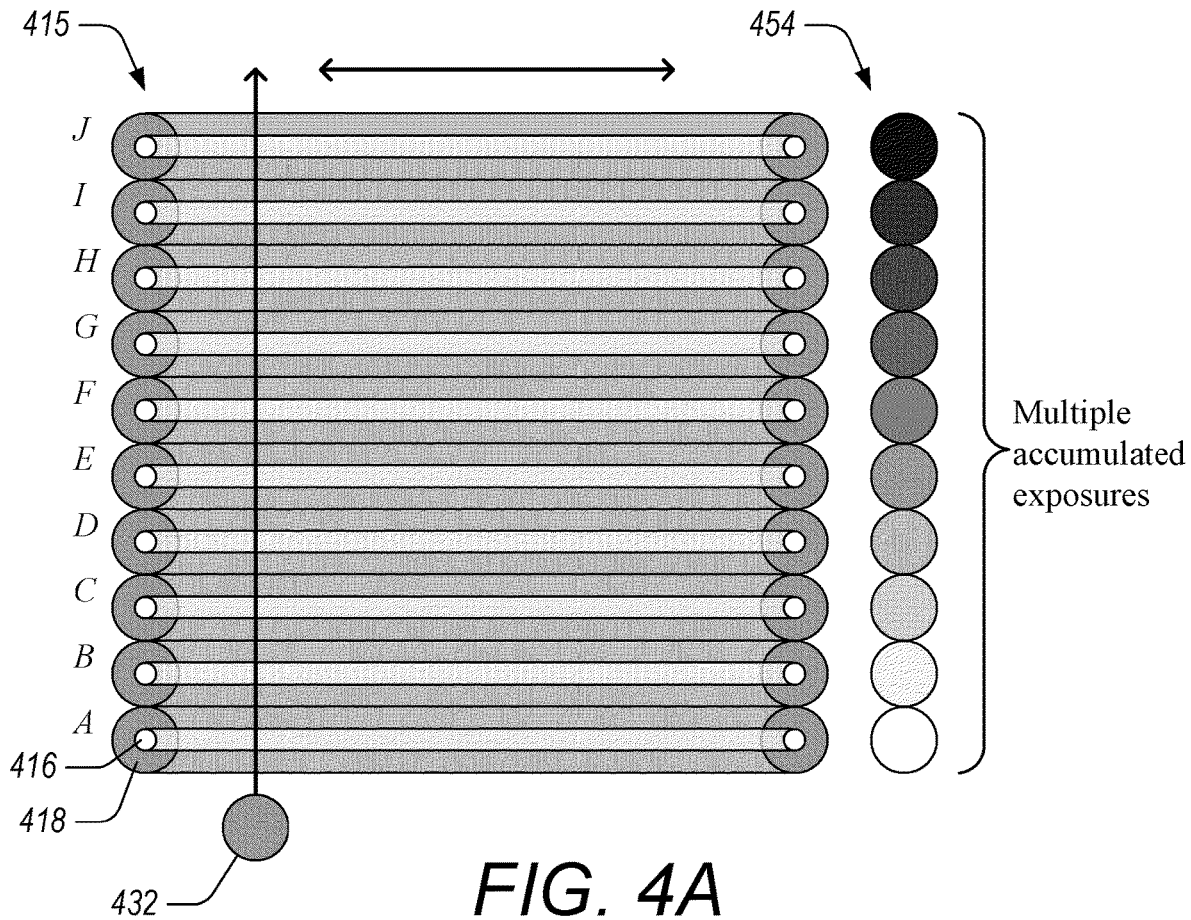
FIGS. 4A and 4B illustrate examples of Stimulation Emission Depletion (STED) line-scans.
Figure 4B:
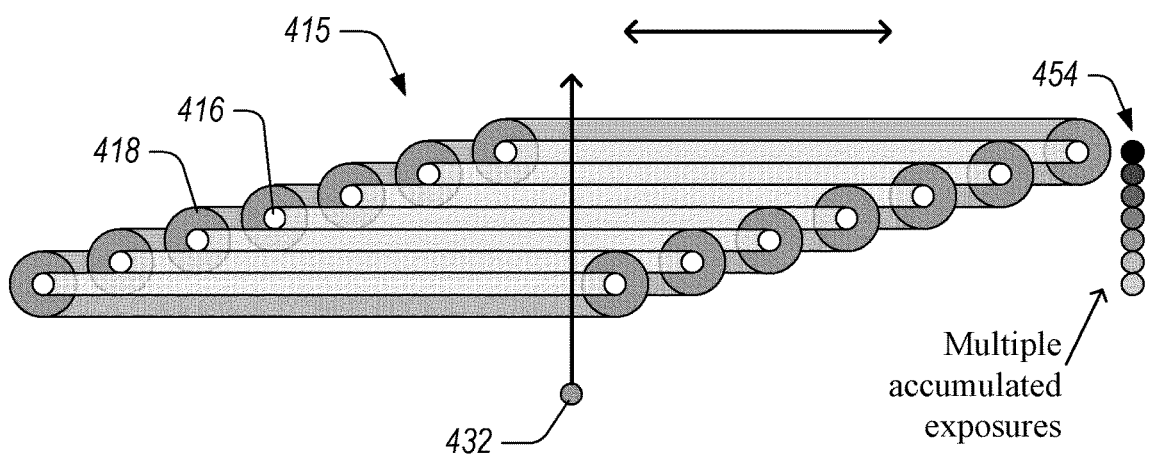

FIGS. 4A and 4B illustrate examples of STED line-scans. The STED line scans include a plurality of STED rings 415 that are scanned across a sample (e.g., horizontally in the figure), each ring having an excitation region 416 and a depletion region 418. A sample and the array of STED rings 415 move relative to one another such that a point 432 on the sample passes through at least a subset of the plurality of STED rings 415. Each time a STED ring is incident on the point 432, the point 432 emits light that is detected by one or more detectors, as described herein. The signals from these detectors can be integrated over time to generate an integrated signal 454 for the point 432. The detection system can include a TDI-like data acquisition system that integrates signals over time for points on a sample. By using the array of STED rings 415, faster scan times can be accomplished while still acquiring signals with a targeted or desirable signal to noise ratio.

To illustrate the TDI-like data acquisition techniques described herein, a particular example will now be described which is not intended to limit the scope of the disclosure. With reference to FIG. 4A, during a time period T1, the point 432 coincides with the "A" STED ring line scan and emits light. During a time period T2, the point 432 coincides with the "B" line scan. During a time period T3, the point 432 coincides with the "C" line scan, and so on through a time period T10 and line scan "J." The light emitted by the point 432 during each time period T1-T10 can be detected by a particular detector. For example, light emitted by the point 432 during time period T1 can be detected by detector D1, light emitted by the point 432 during time period T2 can be detected by detector D2, light emitted by the point 432 during time period T3 can be detected by detector D3, and so on. A detection system can aggregate the signals from the appropriate time periods and the appropriate detectors to generate the integrated signal 454 for the point 432. For example, the detection system can add the signals, S1-S10, acquired by the respective detectors, D1-D10, during the respective time periods, T1-T10, to determine the integrated signal, S_Total:

$$S\_Total = S1 + S2 + \ldots + S10,$$

where SN is the signal detected by the detector DN during time period TN (where N=1, 2, 3, . . . 10). This can be done for a plurality of points on the sample, where each point on the sample emits light that is detected by a particular detector during a particular time period.

The detection system can track from which locations on the sample photons are detected. This can be done using software, hardware, or a combination of both. For example, an individual detector can detect signals that are emitted in response to excitation from a particular STED ring. Accordingly, the detector is associated with that STED ring. The detection system can associate signals detected at particular times with particular points on the sample. The detectors can be CCD cameras, PMTs, APDs, staring sensors, and the like.

In some embodiments, the detector can be an image sensor or similar detector having an array of photon detection elements. In certain implementations, the sample can be mechanically stepped in the sample scan direction (e.g., vertically in FIGS. 4A and 4B), and each mechanical step can correspond to shifting to a new pixel or photon detection element. This can be advantageous where each STED ring is separated by a distance that is greater than or equal to the diffraction limit of the microscopy system. In various implementations, to integrate the signal for a particular point on the sample, electric charge can be shifted from pixel to pixel (or from photon detection element to photon detection element) to follow the point through the detector as the sample is mechanically scanned. In this way, the signal for each point can be integrated using the detection hardware.

FIG. 4A illustrates an array of STED rings 415 that are arranged to be substantially aligned vertically during a line scan across the sample. The excitation regions 416 for each STED ring can be separated by a distance that is greater than or equal to the diffraction limit of the particular microscopy system in use. Furthermore, the array of STED rings 415 can be arranged so that the depletion regions 418 of adjacent rings do not overlap with the excitation regions 416 of adjacent rings.

FIG. 4B illustrates an array of STED rings 415 that are arranged to be staggered horizontally and vertically during a line scan across the sample. The excitation regions 416 for each STED ring can be separated by a distance that is greater than or equal to the diffraction limit of the particular microscopy system in use. Furthermore, the array of STED rings 415 can be arranged so that the depletion regions 418 of adjacent rings do not overlap with the excitation regions 416 of adjacent rings. By staggering the rings horizontally and vertically, the excitation regions 416 of adjacent rings can be scanned so that the scanned excitation regions are substantially adjacent to one another (in the dimension orthogonal to the direction of scan) for each scan across the sample. This can be compared to the arrangement illustrated in FIG. 4A where the scanned excitation regions are spaced apart from one another so that there is space between the excitation regions (in the dimension orthogonal to the direction of scan) for each scan across the sample.

Figure 5:
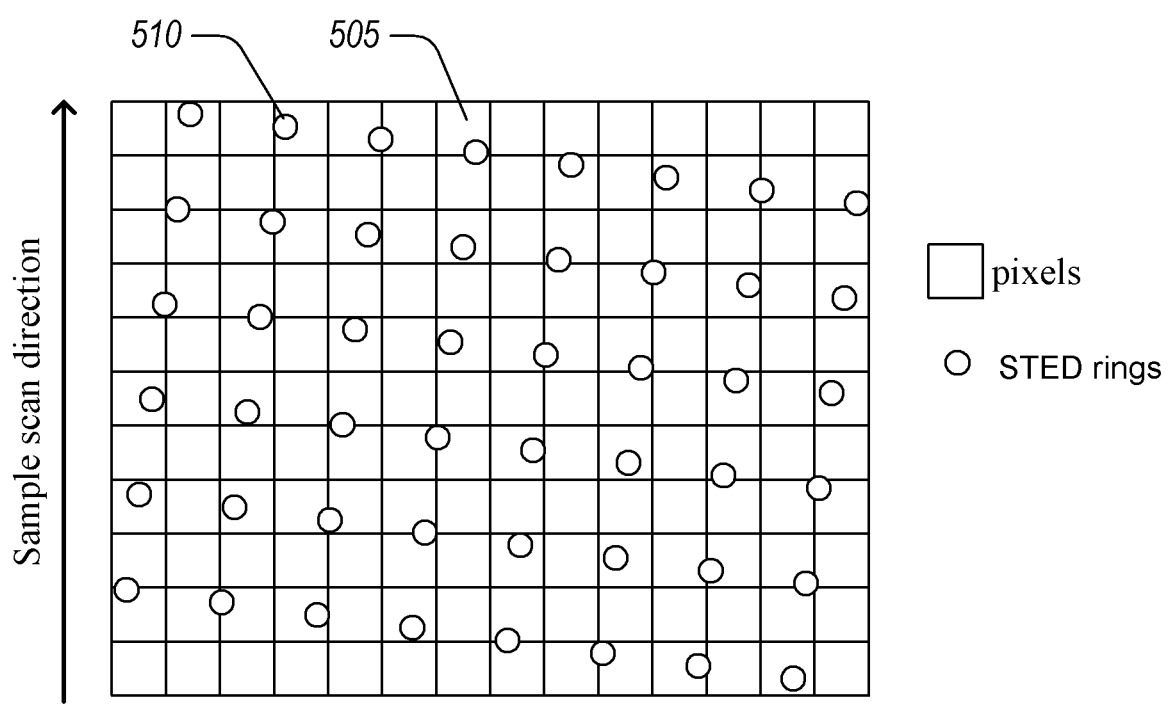
FIG. 5 illustrates an example of scanning a sample through a grid of STED rings tilted with respect to the scan direction.

FIG. 5 illustrates an example of scanning a sample through a grid of STED rings 510, wherein the grid lines are non-orthogonal and non-parallel with respect to the scan direction. The grid of STED rings 510 can be generated as described in greater detail herein. In some embodiments, each ring in the grid of STED rings 510 can be spaced apart from adjacent STED rings by a distance that is greater than or equal to the diffraction limit of the microscopy system. For example, adjacent STED rings can be spaced apart by at least about 200 nm, by at least about 250 nm, or by at least about 300 nm.

The grid of STED rings 510 can be directed to a sample to selectively excite the sample. The emitted light can be directed to an image sensor 505, such as a CCD image sensor, having a plurality of pixels. In some embodiments, a grid of lines through the STED rings 510 (and in turn the grid of areas on the sample excited by the STED rings 510) is at a non-orthogonal and non-parallel angle with respect to the pixel arrangement of the image sensor 505, as illustrated. In certain implementations, grid lines through the STED rings 510 are orthogonal or parallel with respect to the orientation of the pixels of the image sensor. The image sensor 505 can be a high speed image sensor to acquire thousands of frames of image data per second. In some embodiments, the image sensor 505 acquires at least about 10,000 frames per second and the grid of STED rings 510 includes at least about 10,000 rings. It is also possible, in some embodiments, to use a conventional TDI sensor where magnification is sufficiently high. In this case an image can be formed in the sensor similar to a Nipkow disk confocal microscope.

The sample can be mechanically scanned in a direction that is tilted with respect to the grid of STED rings 510. In this way, each STED ring 510 can be made to trace a unique path across the sample such that the collection of STED rings substantially images the entire sample. To image the sample, the sample can be positioned, the excitation and depletion light sources can be flashed, emitted light can be detected, and the sample can be moved to a new position. This process can be repeated until the sample has passed through the grid of STED rings 510. Advantageously, this can allow a super-resolution microscopy system to scan a large sample in relatively little time compared to a STED microscopy system with a single STED ring.

Reducing Laser Power in Super-Resolution Microscopy Systems

Increasing the number of rings, however, may increase laser power consumption to potentially impractically high levels. This may occur due at least in part to the depletion or STED laser being at a red-shifted wavelength relative to the emission spectrum of the dye, targeting the tail of the dye emission spectrum. This is done to prompt stimulated-emission of the dye to the ground state and to avoid re-excitation of the dye by overlapping with the excitation spectrum. In the tail of the emission spectrum, the cross-section between the STED laser and stimulated emission process is very low, requiring a relatively high power density for the STED laser to achieve stimulated emission of the due to the ground state. Another potential cause of undesirably high laser power consumption is that the stimulated emission occurs rapidly (e.g., on the sub-nanosecond timescale), to cause depletion to occur before fluorescence emission. Due to these short timescales, the STED pulse is configured to be relatively intense and to pulse roughly millions of times per second.

To reduce the amount of laser power consumed in such a system, techniques are described herein that utilize different photo-switching mechanisms to achieve sub-diffraction imaging. Similarly, to reduce the amount of laser power consumed in such a system, long Stoke's shift dyes can be used so that the depletion laser operates in a more efficient portion of the spectrum to cause stimulated emission.

Figure 6:
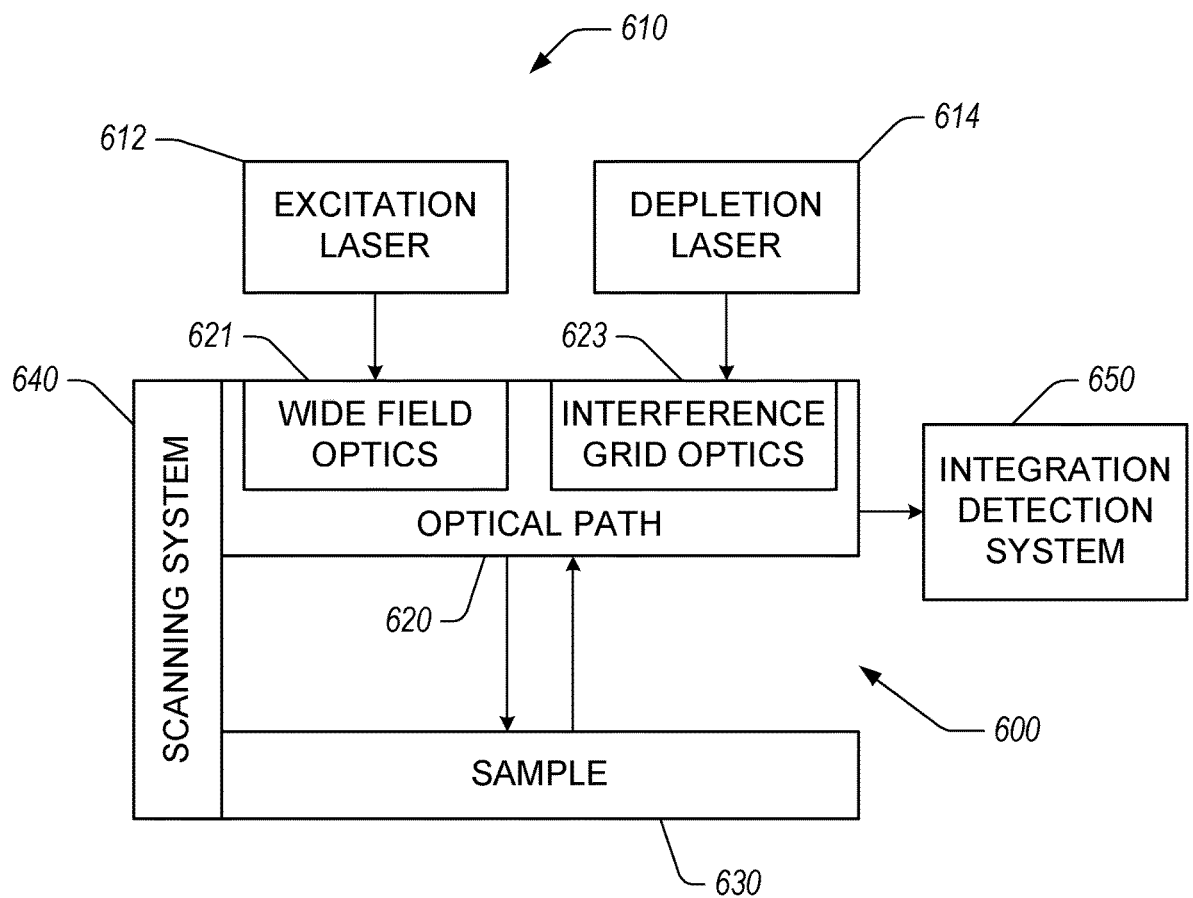
FIG. 6 illustrates another example embodiment of the super-resolution microscopy system of FIG. 1.

Examples of Microscopy Systems with Wide-Field Patterned Illumination and Chemical Photoswitching FIG. 6 illustrates another example embodiment of the super-resolution microscopy system 600 of FIG. 1. The microscopy system 600 includes a light source 610 having an excitation laser 612 and a depletion laser 614. The microscopy system 600 includes an optical path 620 that includes wide field optics 621 and interference grid optics 623, the optical path 620 to direct light from the light source 610 to a sample 630 and light from the sample 630 to an integration detection system 650. The microscopy system 600 includes a scanning system 640 to move the sample 630 and the light from the light source 610 relative to one another to scan the sample 630 to generate image data. The wide field optics 621 can be to spread light from the excitation laser 612 over a relatively large region of the sample to activate the fluorophores in the illuminated region. The interference grid optics 623 can generate a pattern of light from the depletion laser 614 that selectively de-activates almost all of the fluorophores in the region illuminated by the excitation laser 612 (or in a region to be imaged) while leaving targeted fluorophores in sub-diffraction areas (e.g., single or only a few molecules) active.

The microscopy system 600 can achieve super-resolution microscopy at relatively high throughput with reduced or relatively low laser power consumption by combining wide-field and patterned illumination with chemical photo-switching of organic fluorophores. This can be used to create sub-diffraction activated areas that are stable for extended periods. These activated areas can be imaged in a high throughput manner using one or more of the detection techniques described herein.

The microscopy system 600 can be used with the high-speed scanning techniques and TDI-like data acquisition techniques described herein. Furthermore, the microscopy system 600 can consume relatively little laser power by using optical transitions that operate with relatively little power (e.g., in contrast with stimulated emission techniques). Similarly, the microscopy system 600 can consume relatively little laser power through the use of stable, yet reversible, dark states. Utilization of stable dark states can allow the microscopy system 600 to use a single saturation cycle for each imaging cycle in contrast to millions of optical saturation cycles per second for other super-resolution techniques. This reduces the laser power because higher laser powers are generally used to rapidly saturate the optical transitions in a repeated fashion. Another advantage of the microscopy system 600 is that the system 600 can separate the optical patterning and readout/imaging steps.

The microscopy system 600 can be implemented using STORM microscopy and other similar techniques. STORM microscopy employs a photochemical switching mechanism to induce on/off transitions. For example, STORM microscopy is a type of super-resolution optical microscopy technique that is based on stochastic switching of single-molecule fluorescence signals. STORM utilizes fluorescent probes that can switch between fluorescent and dark states and the microscopy system 600 can excite an optically resolvable fraction of the fluorophores. Because only a fraction of the fluorophores is excited, the microscopy system 600 can determine the positions of the fluorophores with relatively high precision based on the center positions of the detected fluorescent signals. With multiple snapshots of the sample, each capturing a subset of the fluorophores based on the patterned illumination described herein, a final super-resolution image can be reconstructed from the accumulated positions.

The microscopy system 600 can utilize an imaging buffer that includes a reducing agent (e.g., MEA) that reduces or reacts with the fluorescent dye. This can create a radical anion, or chemically altered dye, that thereafter exists in a non-fluorescent, dark state. In certain implementations, this reaction can be photochemically enhanced by exciting the fluorophore to its singlet state. After reduction, the fluorophore remains in the dark state for a period, until the dye reacts with an oxidizing agent, such as oxygen. In certain implementations, this reaction can also be photochemically enhanced via the use of UV light (e.g., light at about 405 nm) and the oxygen concentration can be used to tune the rate of "on" switching.

In STORM, the oxygen concentration in the buffer can be tuned to match the stability of the dye off-state, such that the dyes switch back on at a targeted or desired rate. Dyes with stable off-states (e.g., rhodamine and oxazine dyes) can be photoswitched in ambient (e.g., relatively high) levels of oxygen to ensure that the dyes switch back on (or oxidize) at a targeted rate. Dyes with unstable off-states (e.g., carbocyanine dyes) can be photoswitched in low oxygen concentrations (e.g., achieved using enzymatic oxygen scavenging systems) to ensure that the dyes remain off for targeted or desired periods of time. The microscopy system 600 can use the stable off-state dyes (e.g., rhodamine and oxazine) with depleted oxygen levels to further enhance the stability of the dyes to achieve long off states (e.g., on the time scale of seconds or greater than equal to about 1 second). The system may also use combinations of these dyes. In certain embodiments, for example, a 100 mW laser can be used to induce switching between on and off states in a 50×50 µm field of view. In such embodiments, the microscopy system 600 can be about 2500× more efficient at switching between on and off states than typical super-resolution techniques that use stimulated emission (e.g., STED super-resolution microscopy systems).

Generally, the photochemical transitions used in STORM microscopy are not used in high throughput super-resolution microscopy systems because the transitions are too slow (e.g., on the order of milliseconds). However, the microscopy system 600 use STORM-like photochemical reactions while achieving high throughput through a combination of wide field excitation and patterned depletion. For example, the microscopy system 600 can switch fluorescent molecules into long-lived dark states (e.g., off states that are about 10-1000× longer than dark states in typical STORM applications, or at least about 10 ms, at least about 100 ms, or at least about 1 s) and to use wide-field patterned illumination to shape on/off activation across a sample such that targeted diffraction-limited areas are activated. In some embodiments, the off states can last at least about 1 s, 2 s, 5 s, 10 s, 20 s, 30 s, 40 s, 50 s, 60 s, 2 min., 5 min., 10 min., etc. The long lived dark state then allows the sub-diffraction patterned sample to be imaged. Subsequent to imaging, the fluorophores can be reactivated (e.g., using UV light), and another subset of diffraction-limited areas can be re-activated.

This photochemical switching method can be used to bias the majority of the fluorophores into the off-state. The residual, well-spaced "on" molecules can be imaged using the integration detection system 650. The integration detection system 650 can determine molecular positions with sub-diffraction accuracy by virtue of detecting individual molecules or a few to several molecules and determining the center of the corresponding point spread function (PSF). Stochastic on and off switching of the fluorophores and repeated localizations can be used to build-up an image.

In certain implementations, organic fluorophores can be used in conjunction with the microscopy system 600. For example, push-pull fluorogens may be used. In various implementations, organic dyes may be used rather than photoswitchable proteins in conjunction with the microscopy system 600. With organic dyes, the transitions are photochemical and as such are generally slower than the transitions for photoswitchable proteins due at least in part to the required chemical reactions. Transition to the off state can occur on a timescale of milliseconds or seconds, and the transition back to the on-state may also be slow, as both transitions rely on a photochemical reaction. Some aspects of the described microscopy system 600 are related to the realization that the slower switching kinetics of the organic dyes can be leveraged to allow separation of patterning and imaging, permitting the use of lower laser intensities. Where the off-state is relatively long-lived, then a single saturating switching cycle per imaging cycle may be utilized. The length of the fluorophore off-state can be tuned, as described herein, as it involves a reaction with oxygen. Reducing the oxygen concentration, for example, may enhance or increase the off-time. By using a dye that is less easily oxidized in the off-state (e.g., the rhodamine/oxazine class of dyes), the off states can be made to last a relatively long time (e.g., tens of seconds).

Figure 7:
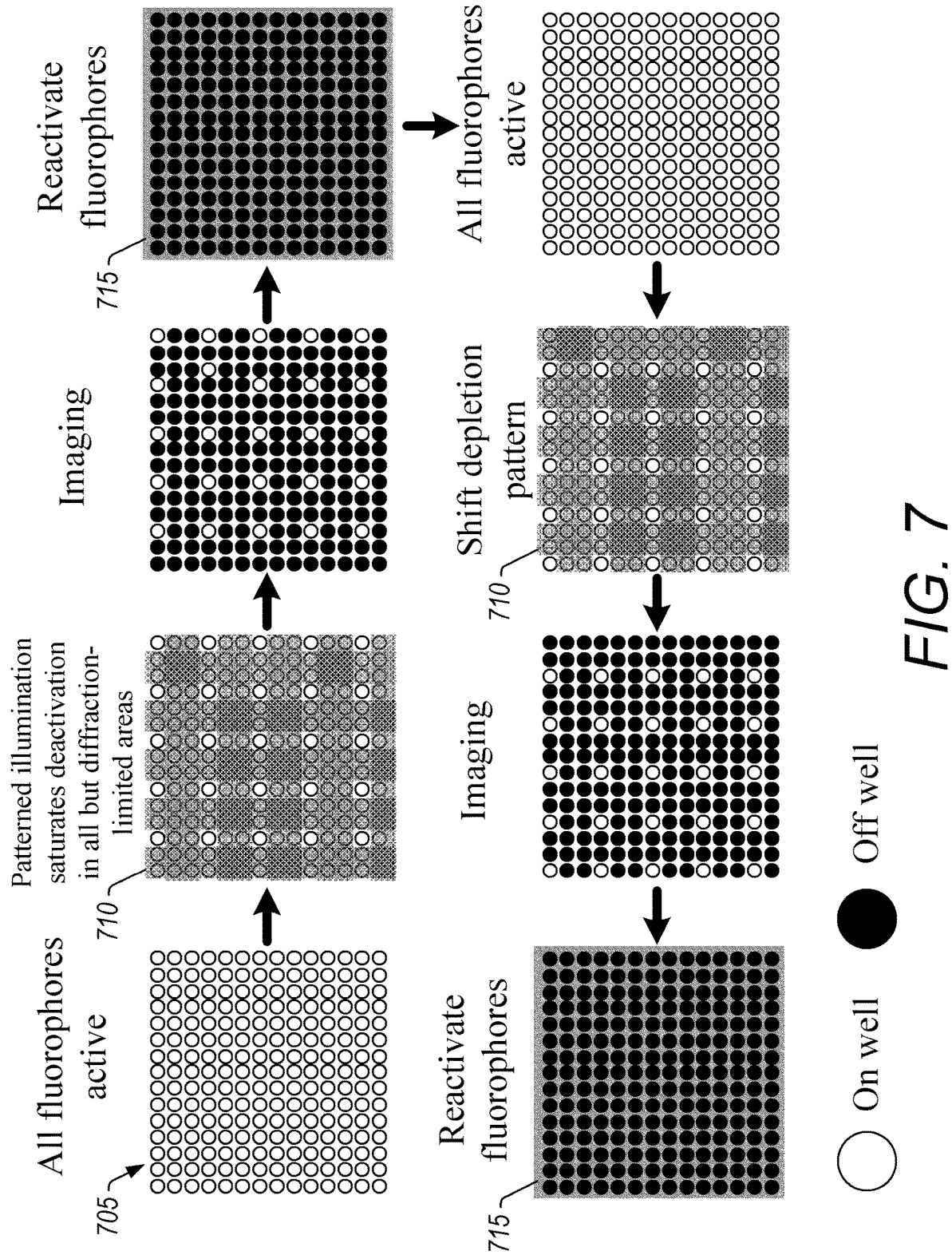
FIG. 7 illustrates a sequence of steps in the acquisition of data using the super-resolution microscopy system of FIG. 6.

FIG. 7 illustrates a sequence of steps in the acquisition of data using the super-resolution microscopy system 600 of FIG. 6. The microscopy system 600 generates an array of activated, sub-diffraction areas prior to imaging, where imaging is accomplished using the TDI-like data acquisition systems and techniques described herein. The array of activated, sub-diffraction areas can then be shifted relative to the sample and imaged again. This process can be repeated to build up an image of the sample over time.

The microscopy system 600 can activate the dyes in a targeted region generating an array of activated fluorophores 705. Activation can be accomplished, for example, using the excitation laser 612 with the wide field optics 621. The excitation laser 612 may be a source of UV light that is spread over the targeted area with the wide field optics 621, for example.

Subsequent to wide field activation, the microscopy system 600 generate an activated array by using, for example, a sinusoidal intensity grid or pattern 710 to switch off targeted dyes in the activated area via a photochemical reaction. For example, light from the depletion laser 614 can be passed through optics such as the interference grid optics 623 to form patterned illumination 710 that de-activates all of the activated dyes except for targeted dyes in diffraction-limited areas. In certain implementations, the patterned grid moves in synch with movement of the sample (e.g., flow cell).

The microscopy system 600 can use the integration detection system 650 to image the resulting array of sub-diffraction activated areas using the TDI-like data acquisition and imaging techniques described herein. The microscopy system 600 can implement these imaging processes due at least in part to the dark state being long-lived, as described herein.

After imaging, the microscopy system 600 can re-activate the molecules using light 715 of a targeted wavelength (e.g., UV light). The microscopy system 600 can use the elements of the optical path 620 (e.g., the interference grid optics 623) and/or the scanning system 640 to shift the patterned grid of light 710 such that different sub-diffraction areas are imaged. The microscopy system can repeat this sequence of steps to build a super-resolution image of the sample 630.

Figure 8:
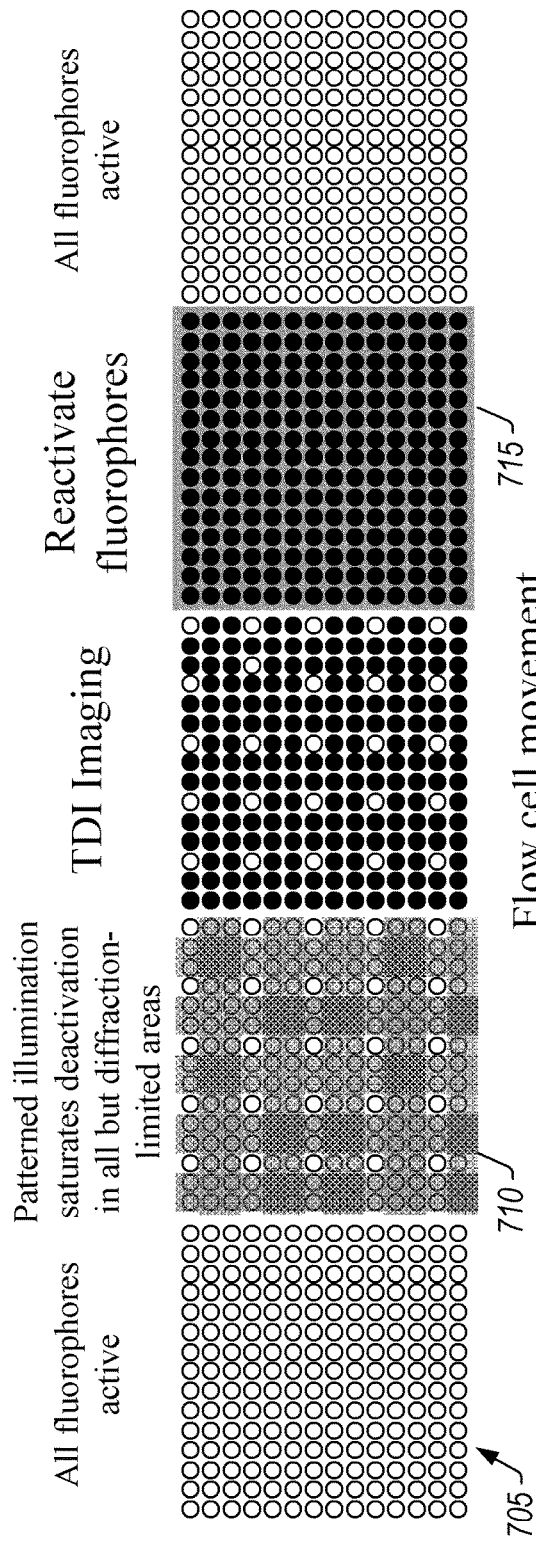
FIG. 8 illustrates a sequence of steps in the acquisition of data using the super-resolution microscopy system of FIG. 6 where a flow cell moves during data acquisition.

FIG. 8 illustrates the processes involved in one example of the acquisition of data using the super-resolution microscopy system 600 of FIG. 6 where a sample (e.g., flow cell) moves during data acquisition. The microscopy system 600 generates wide field illumination to create an array of activated fluorophores 705. The microscopy system 600 generates a standing wave grid for the depletion illumination 710 to produce an array of "zero intensity points" in the sample (e.g., areas that do not get switched off). Fluorophores in the high intensity regions become saturated into their off state, whereas areas at the "zero points" of the patterned illumination, fluorophores remain activated. The size of these areas that remain activated depends at least in part on the intensity of light and exposure time. The areas that remain "on" are in diffraction-limited areas, and collecting fluorescence from these areas provides super-resolution information about the sample 630. After collecting this fluorescence using the integration detection system 650, the microscopy system 600 switches the fluorophores back "on" using wide field illumination 715. The microscopy system 600 shifts the depletion grid 710 such that the positions of the "zero points" are changed relative to the moving sample 630, and the next point of the sample 630 can be interrogated, building up a super-resolution picture of the sample.

The microscopy system 600 uses the patterned depletion grid 710 to photochemically induce fluorophores into the off-state apart from fluorophores in the "zero intensity points" positions. The "off" fluorophores can remain off for tens of seconds (e.g., at least 10 seconds), for example, by virtue of a tailored imaging buffer. For example, the tailored imaging buffer can include low oxygen, low oxidizable dyes, as described herein. After patterning, these fluorophores are imaged, and thereafter reactivated using a wide field excitation light source. The depletion grid pattern can then be shifted with the movement of the sample such that a different subset of fluorophores is activated, and the process is repeated.

Figure 9:
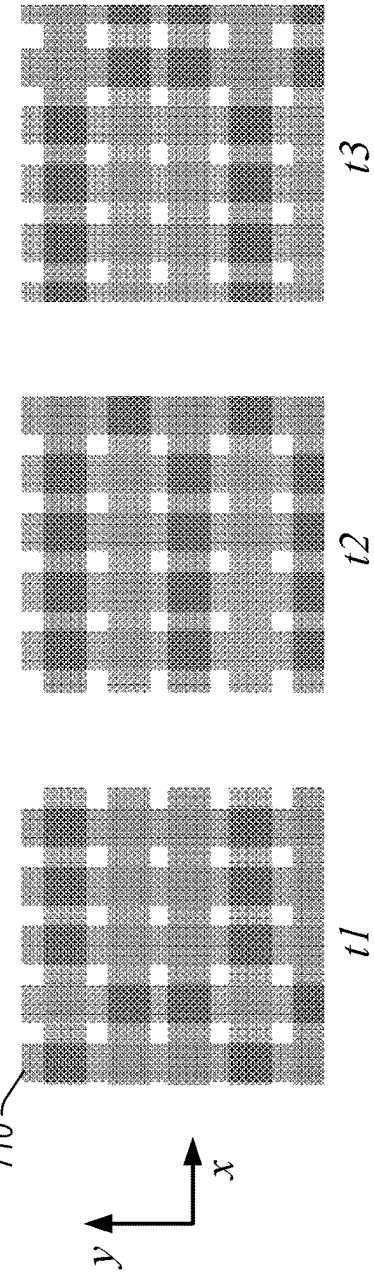
FIG. 9 illustrates an example of movement of patterned illumination generated with the super-resolution microscopy system of FIG. 6 to match movement of a flow cell.

FIG. 9 illustrates an example of movement of patterned illumination 710 generated with the super-resolution microscopy system 600 of FIG. 6 to match movement of the sample (e.g., a flow cell). This modality can be utilized in conjunction with the microscopy system 600 that implements high-speed, scanning TDI-like imaging techniques. In such implementations, the patterned depletion grid 710 can move in synch with the sample 630 (e.g., flow cell) to generate the targeted on/off pattern on the sample 630. The microscopy system 600 can then image the sample 630 and shift the depletion grid 710 relative to the sample 630. While the sample 630 is being moved (e.g., in the x-direction), the depletion grid 710 can move with sample 630 such that the depletion grid is stationary with respect to the sample 630. For example, the depletion grid 710 has features that remain stationary with respect to the y-axis while features move with respect to the y-axis. After the microscopy system 600 scans a portion of the sample 630 in this manner, the depletion grid 710 is laterally and longitudinally shifted by a targeted amount with respect to the sample 630, allowing a different set of fluorophores to be imaged.

The microscopy system 600 can use long-lived dark states of the fluorophores to provide an advantageous way of disentangling patterning and imaging. In typical super-resolution techniques, patterning and imaging happen nearly simultaneously, in a temporally interleaved fashion. When using phototransitions that have fast kinetics, as in typical super-resolution microscopy systems, rapid pulsing and interleaving of the depletion and excitation lasers may add complexity to the system. The microscopy system 600 advantageously reduces this complexity due at least in part to patterning before imaging, as described herein.

Furthermore, the microscopy system 600 can reduce laser power utilization relative to typical super-resolution techniques. For example, typical super-resolution techniques that interleave patterning and imaging generally require high laser powers due at least in part to the laser power intensities needed for saturation of the optical transition for depletion to occur in a relatively briefly time period (e.g., timescales in the microsecond to nanosecond range). These laser power requirements are further increased due at least in part to the frequency of repeating the excitation and photon emission cycles (e.g., millions of times per second). The microscopy system 600 advantageously uses stable, reversible transitions to reduce laser power requirements due at least in part to the on-off transitions being made once per imaging cycle, before imaging (as opposed to millions of times per cycle).

The microscopy system 600 may be particularly advantageous in applications where samples are generally static over time. The use of organic fluorophores that are switched over relatively long times scales, combined with wide-field patterning may advantageously provide super-resolution imaging techniques for applications where time resolution is less important than spatial resolution. For example, in sequencing applications, flow cell samples may be relatively static and unchanging and a low effective "time-resolution" is acceptable while the ability to rapidly image a relatively large field-of-view is particularly advantageous. The microscopy system 600 can provide these advantageous characteristics.

Additional Notes and Terminology

The embodiments described herein are exemplary. Modifications, rearrangements, substitute processes, etc. may be made to these embodiments and still be encompassed within the teachings set forth herein. One or more of the steps, processes, or methods described herein may be carried out by one or more processing and/or digital devices, suitably programmed.

The various illustrative imaging or data processing techniques described in connection with the embodiments disclosed herein can be implemented as electronic hardware, computer software, or combinations of both. To illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative detection systems described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the TDI-like imaging systems described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" or "a device to" are intended to include one or more recited devices. Such one or more recited devices can also be collectively configured to carry out the stated recitations. For example, "a processor to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A super-resolution microscopy system, comprising:
an excitation light source to activate a fluorescent dye;
a depletion light source to photoswitch the fluorescent dye to an off-state;
an optical path comprising a wide field optic component for activating the fluorescent dye in a region using the excitation light source and an interference grid optic component that generates a pattern of light from the depletion light source that selectively deactivates fluorophores in the region while leaving targeted fluorophores in sub-diffraction areas active to form a patterned depletion grid;
a scanning system configured to move a sample;
one or more detectors that receive and integrate signals from the sub-diffraction areas over time and generate an integrated signal for the sub-diffraction areas; and
a processor programmed to determine fluorescence of the sub-diffraction areas from the integrated signal.

2. The system of claim 1, wherein the sub-diffraction areas correspond to fluorescent nucleic acid molecules on a solid support.

3. The system of claim 1, wherein the interference grid optic generates a standing wave grid from the depletion light source.

4. The system of claim 1, wherein the one or more detectors comprise a detector for each sub-diffraction area.

5. The system of claim 1, wherein the optical path includes a waveguide to generate a standing wave with the light from the depletion light source within the waveguide.

6. The system of claim 1, wherein the one or more detectors comprises a single detector to detect light from the sample.

7. The system of claim 6, wherein the single detector comprises a multi-channel photon detector.

8. The system of claim 7, wherein the multi-channel photon detector comprises a CCD image sensor.

9. The system of claim 1 wherein the scanning system is configured to move the sample so that the sub-diffraction areas move relative to the sample.

10. The system of claim 1, wherein the patterned depletion grid moves in synchronization with the sample moved by the scanning system in a first direction.

11. The system of claim 10, wherein the patterned depletion grid remains stationary relative to the sample in a second direction.

12. The system of claim 1, wherein the depletion light source is to photoswitch the fluorescent dye to an off-state for at least one second.

13. A super-resolution microscopy system, comprising:
an excitation light source to activate a fluorescent dye;
a depletion light source to photoswitch the fluorescent dye to an off-state;
an optical path comprising a wide field optic component for activating the fluorescent dye in a region using the excitation light source and an interference grid optic component that generates a plurality of patterned regions comprising a pattern of light from the depletion light source that selectively deactivates fluorophores while leaving targeted fluorophores in sub-diffraction areas active to form a patterned depletion grid;
one or more detectors configured to receive and integrate signals from fluorophores illuminated by the sub-diffraction areas and to generate an integrated signal for the sub-diffraction areas on the sample; and
a processor that receives the integrated signal from the one or more detectors and determines fluorescence of the fluorophores based on the integrated signal.

14. The system of claim 13, wherein the fluorophores have a dark state with a lifetime that is greater than or equal to about 100 ms.

15. The system of claim 13, wherein the off-state of the fluorescent dye is stable for at least 10 seconds.

16. The system of claim 15, wherein the fluorescent dye comprises rhodamine, oxazine or carbocyanine dye.

17. A method of performing super-resolution microscopy to read a sample, the method comprising:
generating an array of sub-diffraction areas by (i) selectively activating fluorophores on a sample using an excitation light source and a wide field optic component and (ii) selectively de-activating fluorophores on the sample using a depletion light source and an interference grid optic component to selectively deactivate fluorophores of the sample leaving targeted fluorophores in the sub-diffraction areas active to form the patterned depletion grid;
receiving and integrating signals from the sub-diffraction areas over time using one or more detectors;
determining an integrated signal for the sub-diffraction areas on the sample; and
determining fluorescence of the sub-diffraction areas on the sample from the integrated signal.

18. The method of claim 17, wherein the sample is an array of nucleic acid features on a solid support.

19. The method of claim 17, wherein the one or more detectors comprises a detector for each sub-diffraction area in the array of sub-diffraction areas.

20. The method of claim 17, wherein generating the array of sub-diffraction areas comprises generating a standing wave with the light from the depletion light.

21. The method of claim 17, further comprising scanning the array of sub-diffraction areas across the sample in a first direction.

22. The method of claim 17 further comprising utilizing an imaging buffer that includes a reducing agent that reacts with a fluorescent dye of the fluorophores to chemically alter the fluorescent dye to a non-fluorescent, dark state.

23. The method of claim 22 further comprising introducing an oxidizing agent.

24. The method of claim 17 further comprising shifting the patterned depletion grid longitudinally or laterally.

25. A method of performing super-resolution microscopy to read a sample, the method comprising:
generating wide field activation illumination to excite fluorophores within an illuminated region;
generating patterned depletion illumination using an interference grid optic component to selectively photoswitch the fluorophores to an off-state in a targeted portion of the illuminated region while leaving targeted fluorophores in sub-diffraction areas active to form a patterned depletion grid;
receiving and integrating signals from the excited fluorophores within the illuminated region using one or more detectors;
generating an integrated signal for sub-diffraction areas on the sample; and
determining fluorescence of the sub-diffraction areas on the sample from the integrated signal.

26. The method of claim 25, wherein the fluorophores have a dark state with a lifetime that is greater than or equal to about 100 ms.

27. The method of claim 25, wherein the fluorophores comprise rhodamine, oxazine or carbocyanine dyes.

28. The method of claim 25, further comprising moving the patterned depletion illumination using a scanning system so that the patterned depletion illumination is stationary with respect to the sample.

29. The method of claim 25, further comprising associating signals generated by the one or more detectors with sub-diffraction areas on the sample using information from the scanning system such that an integrated signal for an sub-diffraction area on the sample is a result of selectively integrating the signals generated by the one or more detectors that received the light emitted from the sub-diffraction area on the sample.

30. The method of claim 25, wherein the patterned depletion illumination generates regions of zero point intensity to selectively de-activate fluorophores within the targeted region while allowing fluorophores within the regions of zero point intensity to remain activated.

31. The method of claim 25 further comprising utilizing an imaging buffer that includes a reducing agent that reacts with a fluorescent dye of the fluorophores to chemically alter the fluorescent dye to a non-fluorescent, dark state.

32. The method of claim 25 further comprising shifting the patterned depletion grid longitudinally or laterally.

* * * * *

UNITED STATES PATENT AND TRADEMARK OFFICE
CERTIFICATE OF CORRECTION

| | |
|---|---|
| PATENT NO. | : 10,901,230 B2 |
| APPLICATION NO. | : 16/311652 |
| DATED | : January 26, 2021 |
| INVENTOR(S) | : Skinner et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 98 days.

Signed and Sealed this
Thirty-first Day of January, 2023

Katherine Kelly Vidal
*Director of the United States Patent and Trademark Office*